United States Patent
Karale et al.

(10) Patent No.: US 11,408,259 B2
(45) Date of Patent: Aug. 9, 2022

(54) REAL-TIME MONITORING AND CONTROL OF DIVERTER PLACEMENT FOR MULTISTAGE STIMULATION TREATMENTS

(71) Applicant: Halliburton Energy Services, Inc., Houston, TX (US)

(72) Inventors: Chaitanya Mallikarjun Karale, Pune (IN); Joshua Lane Camp, Friendswood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 908 days.

(21) Appl. No.: 16/306,525

(22) PCT Filed: Jul. 27, 2016

(86) PCT No.: PCT/US2016/044316
§ 371 (c)(1),
(2) Date: Nov. 30, 2018

(87) PCT Pub. No.: WO2018/022045
PCT Pub. Date: Feb. 1, 2018

(65) Prior Publication Data
US 2019/0145233 A1    May 16, 2019

(51) Int. Cl.
*E21B 43/12*    (2006.01)
*E21B 43/16*    (2006.01)
(Continued)

(52) U.S. Cl.
CPC .............. *E21B 43/12* (2013.01); *E21B 43/16* (2013.01); *E21B 43/25* (2013.01); *E21B 43/26* (2013.01);
(Continued)

(58) Field of Classification Search
CPC . G01V 11/00; G01V 3/38; G01V 1/30; G01V 1/50; G01V 1/306; G01V 1/40;
(Continued)

(56) References Cited

U.S. PATENT DOCUMENTS 7,040,390 B2   5/2006   Tubel et al.
7,201,221 B2   4/2007   Tubel et al.
(Continued)

FOREIGN PATENT DOCUMENTS

EP    2884043 A2 *   6/2015   ............. E21B 43/00
EP    2884043 A2     6/2015
(Continued)

OTHER PUBLICATIONS

Korean Intellectual Property Office, International Search Report and Written Opinion, PCT/US2016/044316, dated Apr. 20, 2017, 19 pages, Korea.

(Continued)

*Primary Examiner* — Jeffrey P Aiello
(74) *Attorney, Agent, or Firm* — Haynes and Boone, LLP

(57) ABSTRACT

System and methods of controlling diverter placement during stimulation treatments are provided. Data relating to at least one downhole parameter is obtained for a current treatment stage within a subsurface formation. A response of the diverter to be injected during a diversion phase of the current stage on the downhole parameter is estimated, based on the obtained data and a diagnostic data model. Values for diversion control parameters are calculated, based on the estimated response. As the diverter is injected into the formation, an actual response of the diverter is monitored. Upon determining that a difference between the actual and estimated response exceeds an error tolerance threshold, the model is updated. The model is further updated over subsequent iterations of the diversion phase when the actual (Continued)

response is less than the estimated response. Subsequent diversion phases are performed over a remainder of the current stage, based on the updated model.

20 Claims, 10 Drawing Sheets

(51) Int. Cl.
    *E21B 43/25*     (2006.01)
    *E21B 41/00*     (2006.01)
    *G01V 99/00*     (2009.01)
    *E21B 43/26*     (2006.01)

(52) U.S. Cl.
    CPC ...... *G01V 99/005* (2013.01); *G01V 2210/624* (2013.01); *G01V 2210/66* (2013.01)

(58) Field of Classification Search
    CPC .......... G01V 1/282; G01V 1/28; E21B 44/00; E21B 49/00; E21B 47/00; E21B 49/008; E21B 43/26; E21B 43/00; E21B 7/04
    USPC .............. 73/152.01–152.5, 152.46, 861.356; 166/250.1–250.2, 250.16, 254.1; 175/24, 175/40, 45, 50, 61; 367/14, 25–27, 31, 367/38, 73–75, 81; 700/28–31, 282; 702/6–7, 9, 11–14, 45, 50, 183, 189; 703/2, 5–6, 9–10
    See application file for complete search history.

(56) References Cited

U.S. PATENT DOCUMENTS

| | | | | |
|---|---|---|---|---|
| 7,516,793 | B2 * | 4/2009 | Dykstra | E21B 43/267 166/177.5 |
| 8,789,587 | B2 | 7/2014 | Tubel et al. | |
| 9,085,975 | B2 * | 7/2015 | Abad | E21B 43/26 |
| 9,135,475 | B2 | 9/2015 | Lecerf et al. | |
| 9,206,659 | B2 | 12/2015 | Zhang et al. | |
| 9,803,467 | B2 * | 10/2017 | Tang | E21B 43/04 |
| 2002/0092650 | A1 | 7/2002 | Tolman et al. | |
| 2006/0025321 | A1 * | 2/2006 | Treybig | C09K 8/68 510/382 |
| 2009/0014168 | A1 | 1/2009 | Tips et al. | |
| 2012/0014211 | A1 | 1/2012 | Maida, Jr. et al. | |
| 2013/0118739 | A1 * | 5/2013 | Collins | E21B 47/01 166/279 |
| 2014/0182841 | A1 * | 7/2014 | Lecerf | E21B 43/25 166/250.01 |
| 2015/0027692 | A1 | 1/2015 | East et al. | |
| 2015/0075778 | A1 | 3/2015 | Walters et al. | |
| 2016/0040520 | A1 * | 2/2016 | Tolman | E21B 33/124 166/308.1 |
| 2016/0047230 | A1 * | 2/2016 | Livescu | E21B 47/07 166/250.01 |
| 2020/0371262 | A1 * | 11/2020 | McClure | E21B 47/11 |

FOREIGN PATENT DOCUMENTS

| | | | |
|---|---|---|---|
| WO | WO2014105451 A2 * | 7/2014 | |
| WO | WO-2014105451 A2 | 7/2014 | |
| WO | WO-2016039773 A1 | 3/2016 | |
| WO | WO-2017003501 A * | 1/2017 | ............ E21B 43/26 |

OTHER PUBLICATIONS

Gustavo A. Ugueto C., Paul T Huckabee and Mathieu M. Molenaar, Challenging Assumptions About Fracture Stimulation Placement Effectiveness Using Fiber Optic Distributed Sensing Diagnostics: Diversion, Stage Isolation and Overflushing, Feb. 3-5, 2015, 12 pages, Society of Petroleum Engineers, SPE-173348-MS, SPE Hydraulic Fracturing Technology Conference, The Woodlands, Texas.
Anup Viswanathan, Hunter Watkins, Jennifer Reese, Andrew Corman and Brian Sinosic Sequenced Fracture Treatment, Diversion Enhances Horizontal Well Completions in the Eagle Ford Shale, Sep. 30-Oct. 2, 2014, 11 pages, Society of Petroleum Engineers, SPE-171660-MS, SPE/CSUR Unconventional Resources Conference, Calgary, Alberta, Canada.
B. Wheaton, K. Haustveit, W. Deeg, J. Miskimins and R. Barree, A Case Study of Completion Effectiveness in the Eagle Ford Shale Using DAS/DTS Observations and Hydraulic Fracture Modeling, Feb. 9-11, 2016, 11 pages, Society of Petroleum Engineers, SPE-179149-MS, SPE Hydraulic Fracturing Technology Conference, The Woodlands, Texas.
Sudhish K. Bakku, Peter Wills and Michael Fehler, Monitoring hydraulic fracturing using Distributed Acoustic Sensing in a treatment well, 2014, 6 pages, SEG Denver 2014 Annual Meeting, Denver, Colorado.
Christopher L Stokely, Acoustics-Based Flow Monitoring During Hydraulic Fracturing, Feb. 9-11, 2016, 24 pages, SPE-179151-MS, Society of Petroleum Engineers, SPE Hydraulic Technology Conference, The Woodlands, Texas.
Gerard Glasbergen, Dan Gualtieri, Rakesh Trehan, Mary Van Domelen and Micky Nelson, Real-Time Diversion Quantification and Optimization Using DTS, Nov. 11-14, 2007, 17 pages, SPE 110707, Society of Petroleum Engineers, 2007 SPE Annual Technical Conference and Exhibition, Anaheim, California.
G. Waters, H. Ramakrishnan, J. Daniels, D. Bentley, J. Belhadi and D. Sparkman, Utilization of Real Time Microseismic Monitoring and Hydraulic Fracture Diversion Technology in the Completion of Barnett Shale Horizontal Wells, May 4-7, 2009, 11 pages, OTC 20268, Offshore Technology Conference, 2009 Offshore Technology Conference, Houston, Texas.
C.A. Wright, E.J. Davis, G.M. Golich, J.F. Ward, S.L. Demetrius, W.A. Minner and L. Weijers, Downhole Tiltmeter Fracture Mapping: Finally Measuring Hydraulic Fracture Dimensions, May 10-13, 1998, 15 pages, SPE 46194, Society of Petroleum Engineers, Inc., 1998 SPE Western Regional Conference, Bakersfield, California.
Francois Cantaloube, Rae Spickett, Kaveh Yekta and Mark Anderson, Optimization of Stimulation Treatments in Naturally Fractured Carbonate Formations Through Effective Diversion and Real-Time Analysis, Mar. 23-25, 2010, 12 pages, SPE 126136, Society of Petroleum Engineers, SPE Intelligent Energy Conference and Exhibition, Utrecht, The Netherlands.
Korean Intellectual Property Office, International Search Report and Written Opinion, PCT/US2016/044310, dated Apr. 18, 2017, 10 pages, Korea.

* cited by examiner

REAL-TIME MONITORING AND CONTROL OF DIVERTER PLACEMENT FOR MULTISTAGE STIMULATION TREATMENTS

CROSS-REFERENCE TO RELATED APPLICATIONS

This application is a U.S. national stage patent application of International Patent Application No. PCT/US2016/044316, filed on Jul. 27, 2016, the benefit of which is claimed and the disclosure of which is incorporated herein by reference in its entirety.

FIELD OF THE DISCLOSURE

The present disclosure relates generally to the design of hydraulic fracturing treatments for stimulating hydrocarbon production from subsurface reservoirs, and particularly, to techniques for controlling the placement and distribution of injected fluids during such stimulation treatments.

BACKGROUND

In the oil and gas industry, a well that is not producing as expected may need stimulation to increase the production of subsurface hydrocarbon deposits, such as oil and natural gas. Hydraulic fracturing is a type of stimulation treatment that has long been used for well stimulation in unconventional reservoirs. A multistage stimulation treatment operation may involve drilling a horizontal wellbore and injecting treatment fluid into a surrounding formation in multiple stages via a series of perforations or formation entry points along a path of a wellbore through the formation. During each of the stimulation treatment, different types of fracturing fluids, proppant materials (e.g., sand), additives and/or other materials may be pumped into the formation via the entry points or perforations at high pressures to initiate and propagate fractures within the formation to a desired extent. With advancements in horizontal well drilling and multi-stage hydraulic fracturing of unconventional reservoirs, there is a greater need for ways to accurately monitor the downhole flow and distribution of injected fluids across different perforation clusters and efficiently deliver treatment fluid into the subsurface formation.

Diversion is a technique used in injection treatments to facilitate uniform distribution of treatment fluid over each stage of the treatment. Diversion may involve the delivery of diverter material into the wellbore to divert injected treatment fluids toward formation entry points along the wellbore path that are receiving inadequate treatment. Examples of such diverter material include, but are not limited to, viscous foams, particulates, gels, benzoic acid and other chemical diverters. Traditionally, operational decisions related to the use of diversion technology for a given treatment stage, including when and how much diverter is used, are made a priori according to a predefined treatment schedule. However, conventional diversion techniques based on such predefined treatment schedules fail to account for actual operating conditions that affect the downhole flow distribution of the treatment fluid over the course of the stimulation treatment.

DESCRIPTION OF ILLUSTRATIVE EMBODIMENTS

Figure 1:
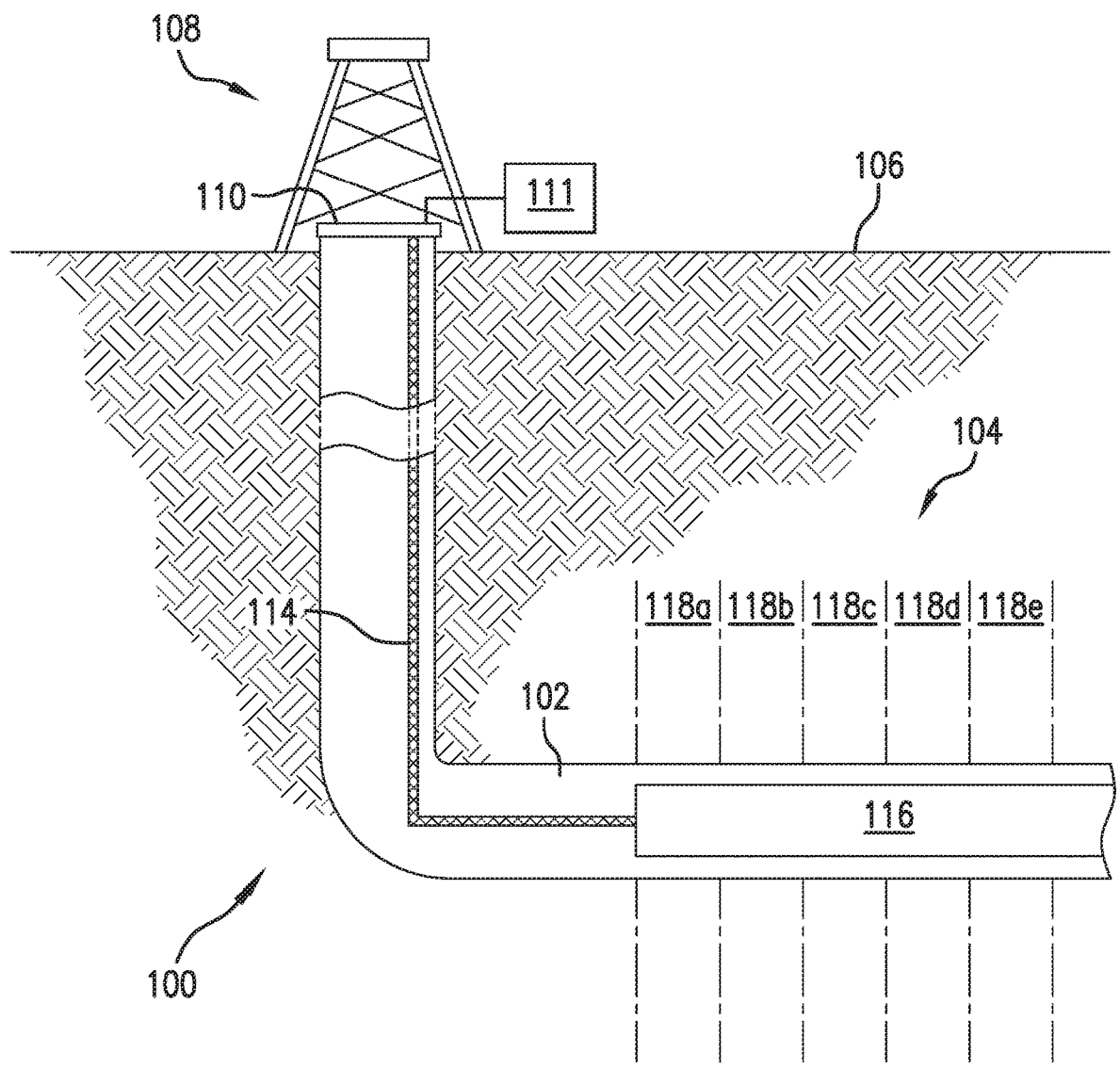
FIG. 1 is a diagram of an illustrative well system for a multistage stimulation treatment of a hydrocarbon reservoir formation.

Embodiments of the present disclosure relate to real-time monitoring and control of diverter placement for multistage stimulation treatments. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As will be described in further detail below, embodiments of the present disclosure may be used to make real-time operational decisions regarding the use of diversion to adjust the flow distribution of treatment fluid during a stimulation treatment. For example, the stimulation treatment may involve injecting the treatment fluid into a subsurface formation via a plurality of formation entry points (or "perforation clusters") along a wellbore path within the subsurface formation. In one or more embodiments, real-time measurements and diagnostic data obtained from one or more data sources at the wellsite may be used to monitor the downhole flow distribution of the injected treatment fluid during each stage of the stimulation treatment. Such wellsite data may be used to perform a quantitative and/or a qualitative analysis of various factors affecting the downhole flow distribution under current operating conditions. The results of the analysis may then be used to determine when and how to deploy diverter material into the wellbore in order to appropriately partition or otherwise modify a baseline treatment schedule. Adjustments to the stimulation treatment, including changes to the amount of diverter that is deployed, may be made while the treatment is in progress in order to improve the flow distribution and perforation cluster efficiency. The flow distribution and perforation cluster efficiency may be improved by using the diverter to effectively plug certain formation entry points or perforation clusters along the wellbore path and thereby divert the injected treatment fluid toward other formation entry points receiving inadequate treatment. This allows the coverage of the stimulation treatment and the recovery of hydrocarbons from the reservoir formation to be increased. The ability to make such adjustments in real-time may also allow wellsite operators to reduce the amount of time and materials needed to perform each stage of the treatment, thereby reducing the overall costs of the treatment.

Illustrative embodiments and related methodologies of the present disclosure are described below in reference to the examples shown in FIGS. 1-10 as they might be employed, for example, in a computer system for real-time monitoring and control of diversion placement during stimulation treatments. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of a multistage hydraulic fracturing treatment, it should be appreciated that the real-time flow distribution monitoring and diversion control techniques are not intended to be limited thereto and that these techniques may be applied to other types of stimulation treatments, e.g., matrix acidizing treatments.

FIG. 1 is a diagram illustrating an example of a well system 100 for performing a multistage stimulation treatment of a hydrocarbon reservoir formation. As shown in the example of FIG. 1, well system 100 includes a wellbore 102 in a subsurface formation 104 beneath a surface 106 of the wellsite. Wellbore 102 as shown in the example of FIG. 1 includes a horizontal wellbore. However, it should be appreciated that embodiments are not limited thereto and that well system 100 may include any combination of horizontal, vertical, slant, curved, and/or other wellbore orientations. The subsurface formation 104 may include a reservoir that contains hydrocarbon resources, such as oil, natural gas, and/or others. For example, the subsurface formation 104 may be a rock formation (e.g., shale, coal, sandstone, granite, and/or others) that includes hydrocarbon deposits, such as oil and natural gas. In some cases, the subsurface formation 104 may be a tight gas formation that includes low permeability rock (e.g., shale, coal, and/or others). The subsurface formation 104 may be composed of naturally fractured rock and/or natural rock formations that are not fractured to any significant degree.

Well system 100 also includes a fluid injection system 108 for injecting treatment fluid, e.g., hydraulic fracturing fluid, into the subsurface formation 104 over multiple sections 118a, 118b, 118c, 118d, and 118e (collectively referred to herein as "sections 118") of the wellbore 102, as will be described in further detail below. Each of the sections 118 may correspond to, for example, a different stage or interval of the multistage stimulation treatment. The boundaries of the respective sections 118 and corresponding treatment stages/intervals along the length of the wellbore 102 may be delineated by, for example, the locations of bridge plugs, packers and/or other types of equipment in the wellbore 102. Additionally or alternatively, the sections 118 and corresponding treatment stages may be delineated by particular features of the subsurface formation 104. Although five sections are shown in FIG. 1, it should be appreciated that any number of sections and/or treatment stages may be used as desired for a particular implementation. Furthermore, each of the sections 118 may have different widths or may be uniformly distributed along the wellbore 102.

As shown in FIG. 1, injection system 108 includes an injection control subsystem 111, a signaling subsystem 114 installed in the wellbore 102, and one or more injection tools 116 installed in the wellbore 102. The injection control subsystem 111 can communicate with the injection tools 116 from a surface 110 of the wellbore 102 via the signaling subsystem 114. Although not shown in FIG. 1, injection system 108 may include additional and/or different features for implementing the flow distribution monitoring and diversion control techniques disclosed herein. For example, the injection system 108 may include any number of computing subsystems, communication subsystems, pumping subsystems, monitoring subsystems, and/or other features as desired for a particular implementation. In some implementations, the injection control subsystem 111 may be communicatively coupled to a remote computing system (not shown) for exchanging information via a network for purposes of monitoring and controlling wellsite operations, including operations related to the stimulation treatment. Such a network may be, for example and without limitation, a local area network, medium area network, and/or a wide area network, e.g., the Internet.

During each stage of the stimulation treatment, the injection system 108 may alter stresses and create a multitude of fractures in the subsurface formation 104 by injecting the treatment fluid into the surrounding subsurface formation 104 via a plurality of formation entry points along a portion of the wellbore 102 (e.g., along one or more of sections 118). The fluid may be injected through any combination of one or more valves of the injection tools 116. The injection tools 116 may include numerous components including, but not limited to, valves, sliding sleeves, actuators, ports, and/or other features that communicate treatment fluid from a working string disposed within the wellbore 102 into the subsurface formation 104 via the formation entry points. The formation entry points may include, for example, open-hole sections along an uncased portion of the wellbore path, a cluster of perforations along a cased portion of the wellbore path, ports of a sliding sleeve completion device along the wellbore path, slots of a perforated liner along the wellbore path, or any combination of the foregoing.

The injection tools 116 may also be used to perform diversion in order to adjust the downhole flow distribution of the treatment fluid across the plurality of formation entry points. Thus, the flow of fluid and delivery of diverter material into the subsurface formation 104 during the stimulation treatment may be controlled by the configuration of the injection tools 116. The diverter material injected into the subsurface formation 104 may be, for example, a degradable polymer. Examples of different degradable polymer materials that may be used include, but are not limited to, polysaccharides; lignosulfonates; chitins; chitosans; proteins; proteinous materials; fatty alcohols; fatty esters; fatty acid salts; aliphatic polyesters; poly(lactides); poly(glycolides); poly(ε-caprolactones); polyoxymethylene; polyurethanes; poly(hydroxybutyrates); poly(anhydrides); aliphatic polycarbonates; polyvinyl polymers; acrylic-based polymers; poly(amino acids); poly(aspartic acid); poly(alkylene oxides); poly(ethylene oxides); polyphosphazenes; poly(orthoesters); poly(hydroxy ester ethers); polyether esters; polyester amides; polyamides; polyhydroxyalkanoates; polyethyleneterephthalates; polybutyleneterephthalates; polyethylenenaphthalenates, and copolymers, blends, derivatives, or combinations thereof. However, it should be appreciated that embodiments of the present disclosure are not intended to be limited thereto and that other types of diverter materials may also be used.

In one or more embodiments, the valves, ports, and/or other features of the injection tools 116 can be configured to control the location, rate, orientation, and/or other properties of fluid flow between the wellbore 102 and the subsurface formation 104. The injection tools 116 may include multiple tools coupled by sections of tubing, pipe, or another type of conduit. The injection tools may be isolated in the wellbore 102 by packers or other devices installed in the wellbore 102.

In some implementations, the injection system 108 may be used to create or modify a complex fracture network in the subsurface formation 104 by injecting fluid into portions of the subsurface formation 104 where stress has been altered. For example, the complex fracture network may be created or modified after an initial injection treatment has altered stress by fracturing the subsurface formation 104 at multiple locations along the wellbore 102. After the initial injection treatment alters stresses in the subterranean formation, one or more valves of the injection tools 116 may be selectively opened or otherwise reconfigured to stimulate or re-stimulate specific areas of the subsurface formation 104 along one or more sections 118 of the wellbore 102, taking advantage of the altered stress state to create complex fracture networks. In some cases, the injection system 108 may inject fluid simultaneously for multiple intervals and sections 118 of wellbore 102.

The operation of the injection tools 116 may be controlled by the injection control subsystem 111. The injection control subsystem 111 may include, for example, data processing equipment, communication equipment, and/or other systems that control injection treatments applied to the subsurface formation 104 through the wellbore 102. In one or more embodiments, the injection control subsystem 111 may receive, generate, or modify a baseline treatment plan for implementing the various stages of the stimulation treatment along the path of the wellbore 102. The baseline treatment plan may specify initial parameters for the treatment fluid to be injected into the subsurface formation 104. The treatment plan may also specify a baseline pumping schedule for the treatment fluid injections and diverter deployments over each stage of the stimulation treatment.

In one or more embodiments, the injection control subsystem 111 initiates control signals to configure the injection tools 116 and/or other equipment (e.g., pump trucks, etc.) for operation based on the treatment plan. The signaling subsystem 114 as shown in FIG. 1 transmits the signals from the injection control subsystem 111 at the wellbore surface 110 to one or more of the injection tools 116 disposed in the wellbore 102. For example, the signaling subsystem 114 may transmit hydraulic control signals, electrical control signals, and/or other types of control signals. The control signals may be reformatted, reconfigured, stored, converted, retransmitted, and/or otherwise modified as needed or desired en route between the injection control subsystem 111 (and/or another source) and the injection tools 116 (and/or another destination). The signals transmitted to the injection tools 116 may control the configuration and/or operation of the injection tools 116. Examples of different ways to control the operation of each of the injection tools 116 include, but are not limited to, opening, closing, restricting, dilating, repositioning, reorienting, and/or otherwise manipulating one or more valves of the tool to modify the manner in which treatment fluid, proppant, or diverter is communicated into the subsurface formation 104. It should be appreciated that the combination of injection valves of the injection tools 116 may be configured or reconfigured at any given time during the stimulation treatment. It should also be appreciated that the injection valves may be used to inject any of various treatment fluids, proppants, and/or diverter materials into the subsurface formation 104. Examples of such proppants include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, lightweight particulates, microsphere plastic beads, ceramic microspheres, glass microspheres, manmade fibers, cement, fly ash, carbon black powder, and combinations thereof.

In some implementations, the signaling subsystem 114 transmits a control signal to multiple injection tools, and the control signal is formatted to change the state of only one or a subset of the multiple injection tools. For example, a shared electrical or hydraulic control line may transmit a control signal to multiple injection valves, and the control signal may be formatted to selectively change the state of only one (or a subset) of the injection valves. In some cases, the pressure, amplitude, frequency, duration, and/or other properties of the control signal determine which injection tool is modified by the control signal. In some cases, the pressure, amplitude, frequency, duration, and/or other properties of the control signal determine the state of the injection tool affected by the modification.

In one or more embodiments, the injection tools 116 may include one or more sensors for collecting data relating to downhole operating conditions and formation characteristics along the wellbore 102. Such sensors may serve as real-time data sources for various types of downhole measurements and diagnostic information pertaining to each stage of the stimulation treatment. Examples of such sensors include, but are not limited to, micro-seismic sensors, tiltmeters, pressure sensors, and other types of downhole sensing equipment. The data collected downhole by such sensors may include, for example, real-time measurements and diagnostic data for monitoring the extent of fracture growth and complexity within the surrounding formation along the wellbore 102 during each stage of the stimulation treatment, e.g., corresponding to one or more sections 118. In some implementations, the injection tools 116 may include fiber-optic sensors for collecting real-time measurements of acoustic intensity or thermal energy downhole during the stimulation treatment. For example, the fiber-optic sensors may be components of a distributed acoustic sensing (DAS), distributed strain sensing, and/or distributed temperature sensing (DTS) subsystems of the injection system 108. However, it should be appreciated that embodiments are not intended to be limited thereto and that the injection tools 116 may include any of various measurement and diagnostic tools. In some implementations, the injection tools 116 may be used to inject particle tracers, e.g., tracer slugs, into the wellbore 102 for monitoring the flow distribution based on the distribution of the injected particle tracers during the treatment. For example, such tracers may have a unique temperature profile that the DTS subsystem of the injection system 108 can be used to monitor over the course of a treatment stage.

In one or more embodiments, the signaling subsystem 114 may be used to transmit real-time measurements and diagnostic data collected downhole by one or more of the aforementioned data sources to the injection control subsystem 111 for processing at the wellbore surface 110. Thus, in the fiber-optics example above, the downhole data collected by the fiber-optic sensors may be transmitted to the injection control subsystem 111 via, for example, fiber optic cables included within the signaling subsystem 114. The injection control subsystem 111 (or data processing components thereof) may use the downhole data that it receives via the signaling subsystem 114 to perform real-time fracture mapping and/or real-time fracturing pressure interpretation using any of various data analysis techniques for monitoring stress fields around hydraulic fractures.

The injection control subsystem 111 may use the real-time measurements and diagnostic data received from the data source(s) to monitor a downhole flow distribution of the treatment fluid injected into the plurality of formation entry points along the path of the wellbore 102 during each stage of the stimulation treatment. In one or more embodiments, such data may be used to derive qualitative and/or quantitative indicators of the downhole flow distribution for a given stage of the treatment. One such indicator may be, for example, the amount of flow spread across the plurality of formation entry points into which the treatment fluid is injected. As used herein, the term "flow spread" refers to a measure of how far the downhole flow distribution deviates from an ideal distribution. An ideal flow distribution may be one in which there is uniform distribution or equal flow into most, if not all, of the formation entry points, depending upon local stress changes or other characteristics of the surrounding formation that may impact the flow distribution for a given treatment stage. Another indicator of the downhole flow distribution may be the number of sufficiently stimulated formation entry points or perforation clusters resulting from the fluid injection along the wellbore 102. A formation entry point or perforation cluster may be deemed sufficiently stimulated if, for example, the volume of fluid and proppant that it has received up to a point in the treatment stage has met a threshold. The threshold may be based on, for example, predetermined design specifications of the particular treatment. While the threshold may be described herein as a single value, it should be appreciated that embodiments are not intended to be limited thereto and that the threshold may be a range of values, e.g., from a minimum threshold value to a maximum threshold value.

In one or more embodiments, the above-described indicators of downhole flow distribution may be derived by the injection control subsystem 111 by performing a qualitative and/or quantitative analysis of the real-time measurements and diagnostic data to determine the flow spread and stimulated cluster parameters. The type of analysis performed by the injection control subsystem 111 for determining the flow spread and number of sufficiently stimulated entry points or perforation clusters may be dependent upon the types of measurements and diagnostics (and data sources) that are available during the treatment stage.

For example, the injection control subsystem 111 may determine such parameters based on a qualitative analysis of real-time measurements of acoustic intensity or temporal heat collected by fiber-optic sensors disposed within the wellbore 102 as described above. Alternatively, the injection control subsystem 111 may perform a quantitative analysis using the data received from the fiber-optic sensors. The quantitative analysis may involve, for example, assigning flow percentages to each formation entry point or perforation cluster based on acoustic and/or thermal energy data accumulated for each entry point or cluster and then using the assigned flow percentages to calculate a corresponding coefficient representing the variation of the fluid volume distribution across the formation entry points.

In another example, the injection control subsystem 111 may determine the flow spread and/or number of sufficiently stimulated entry points by performing a quantitative analysis of real-time micro-seismic data collected by downhole micro-seismic sensors, e.g., as included within the injections tools 116. The micro-seismic sensors may be, for example, geophones located in a nearby wellbore, which may be used to measure microseismic events within the surrounding subsurface formation 104 along the path of the wellbore 102. The quantitative analysis may be based on, for example, the location and intensity of micro-seismic activity. Such activity may include different micro-seismic events that may affect fracture growth within the subsurface formation 104. In one or more embodiments, the length and height of a fracture may be estimated based on upward and downward growth curves generated by the injection control subsystem 111 using the micro-seismic data from the micro-seismic sensors. Such growth curves may in turn be used to estimate a surface area of the fracture. The fracture's surface area may then be used to compute the volume distribution and flow spread.

In yet another example, the injection control subsystem 111 may use real-time pressure measurements obtained from downhole and surface pressure sensors to perform real-time pressure diagnostics and analysis. The results of the analysis may then be used to determine the downhole flow distribution indicators, i.e., the flow spread and number of sufficiently stimulated formation entry points, as described above. The injection control subsystem 111 in this example may perform an analysis of surface treating pressure as well as friction analysis and/or other pressure diagnostic techniques to obtain a quantitative measure of the flow spread and number of sufficiently simulated entry points.

In a further example, the injection control subsystem 111 may use real-time data from one or more tiltmeters to infer fracture geometry through fracture induced rock deformation during each stage of the stimulation treatment. The tiltmeters in this example may include surface tiltmeters, downhole tiltmeters, or a combination thereof. The measurements acquired by the tiltmeters may be used to perform a quantitative evaluation of the flow spread and sufficiently stimulated formation entry points during each stage of the stimulation treatment.

It should be noted that the various analysis techniques in the examples above are provided for illustrative purposes only and that embodiments of the present disclosure are not intended to be limited thereto. The disclosed embodiments may be applied to other types of wellsite data, data sources, and analysis or diagnostic techniques for determining the downhole flow distribution or indications thereof. It should also be noted that each of the above described analysis techniques may be used independently or combined with one or more other techniques. In some implementations, the analysis for determining the flow spread and number of sufficiently stimulated entry points may include applying real-time measurements obtained from one or more of the above-described sources to an auxiliary flow distribution model. For example, real-time measurements collected by the data source(s) during a current stage of the stimulation treatment may be applied to a geomechanics model of the subsurface formation 104 to simulate flow distribution along the wellbore 102. The results of the simulation may then be used to determine a quantitative measure of the flow spread and number of sufficiently stimulated formation entry points over a remaining portion of the current stage to be performed.

As will be described in further detail below, the injection control subsystem 111 may use the flow spread and number of sufficiently stimulated formation entry points determined from the analysis results to make real-time adjustments to the baseline treatment plan. For example, the flow spread and number of sufficiently stimulated formation entry points may be used to make real-time operational decisions on when and how to adjust the baseline treatment plan in order to optimize the downhole flow distribution during each stage of the stimulation treatment. Real-time adjustments to the baseline treatment schedule may be used to control the timing of treatment injections and diverter deployments over the course of a treatment stage. Adjustments may also be made to operating variables of the injection treatment including, for example and without limitation, the fluid injection pressure or rate. Accordingly, the injection control subsystem 111 may initiate additional control signals to reconfigure the injection tools 116 based on the adjusted treatment plan.

In one or more embodiments, the flow spread may be used to determine whether or not the baseline treatment plan for a current stage of the stimulation treatment should be partitioned using diversion, e.g., with a bulk diverter drop added as an intermediary phase between treatment cycles of the partitioned stage. It is assumed for purposes of this example that the initial baseline treatment plan does not include such a diversion phase. The determination of whether the diversion phase should be added in order to partition the baseline treatment may be based on a comparison between the flow spread and a bulk diversion criterion. If the flow spread confirms that no bulk diversion is needed based on the comparison, then the initial full treatment is continued without any interruption. Otherwise, the current stage of the treatment is partitioned into a plurality of treatment cycles with at least one diversion phase between consecutive cycles. In contrast with conventional solutions in which the decision for partitioning the treatment is made prior to the beginning of the treatment, the real-time monitoring and diversion control techniques disclosed herein allow for improved cluster efficiency and better fracture geometry overall.

The bulk diversion criterion may be, for example, a predetermined threshold established prior to the beginning of the current stage. The predetermined threshold may be a qualitative or quantitative value based on various factors including, but not limited to, completion design as well as formation and reservoir properties. An example of a quantitative threshold value is a predetermined coefficient of variation based on historical wellsite data, e.g., DAS measurements collected downhole during a previously conducted stimulation treatment at another wellsite in the same hydrocarbon producing field. The measurements in this example may have shown that treatment stages having a coefficient of variation at or above a particular value (e.g., 0.35) benefited from a bulk diverter drop while those stages having a variation coefficient below this value did not.

In one or more embodiments, the determination of whether or not to partition the current treatment stage may be made at some predefined point during the implementation of the stage along the wellbore 102. Ideally, such a "determination point" is early enough in the treatment schedule such that the potential for over-stimulation of the formation entry points is minimized but far enough into the treatment that the flow spread has stabilized. Examples of the determination point include, but are not limited to, the end of the pad stage or the end of the first low concentration proppant ramp. The determination point may be selected prior to the beginning of the treatment stage. Additionally or alternatively, the determination point may be selected or adjusted dynamically, e.g., when the flow spread meets or exceeds a predetermined threshold.

Figure 2:
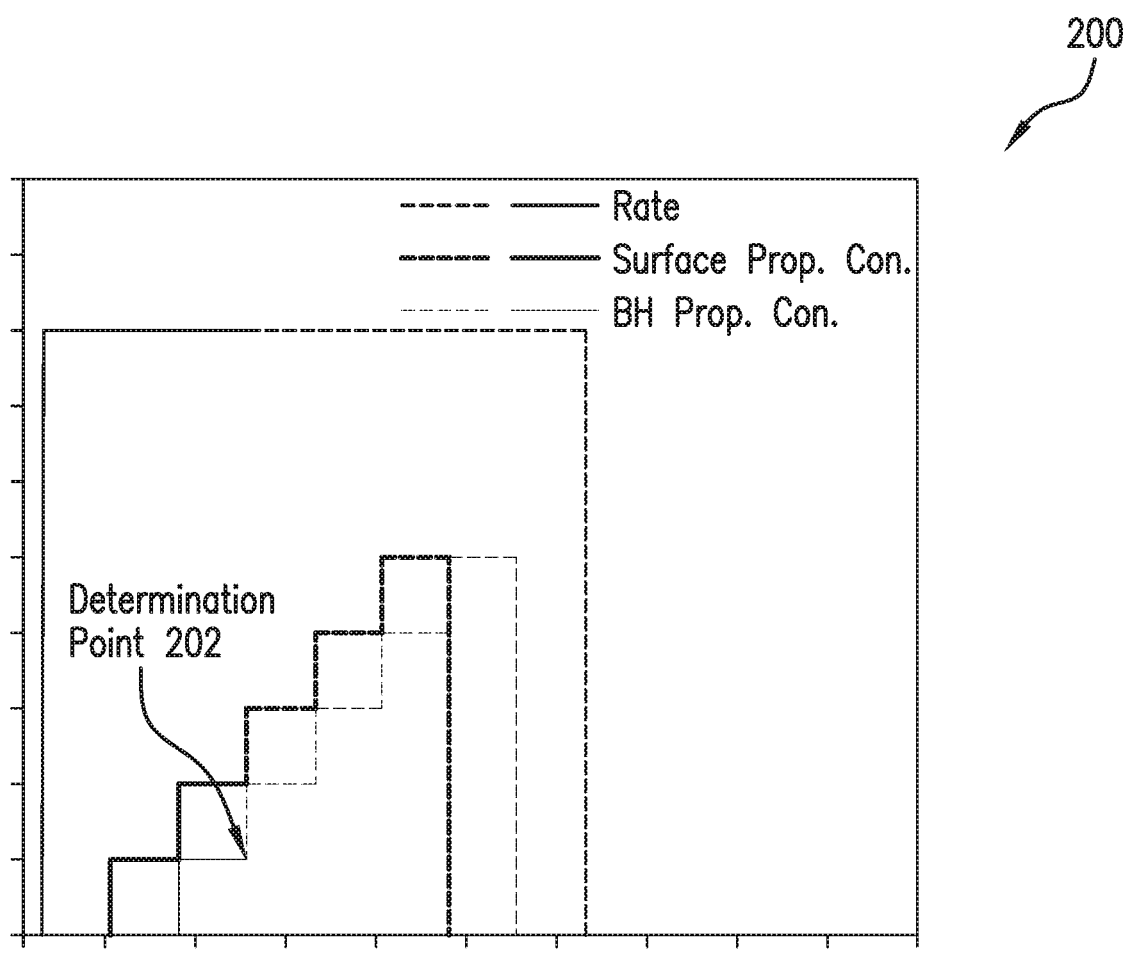
FIG. 2 is a plot graph illustrating the location of a determination point for partitioning a current stage of a stimulation treatment based on different parameters associated with the injected treatment fluid during the current stage.

FIG. 2 is a plot graph 200 illustrating the location of a determination point 202 relative to flow rate and proppant concentration profiles for a stage of the stimulation treatment as described above. The determination point 202 in this example may correspond to a point at which proppant is first injected into the formation entry points along a corresponding portion of the wellbore, e.g., one or more of sections 118 along wellbore 102 of FIG. 1, as described above. The solid lines in the plot graph 200 represent a portion of the total treatment fluid allocated to this treatment stage that has actually been injected into the formation entry points before reaching the determination point 202. Accordingly, the dashed lines in the plot graph 200 represent a remaining portion of the treatment fluid to be injected into the formation entry points over the remainder of the treatment stage. The allocation of the treatment fluid may be based on, for example, a baseline treatment plan, as described above.

Figure 3A:
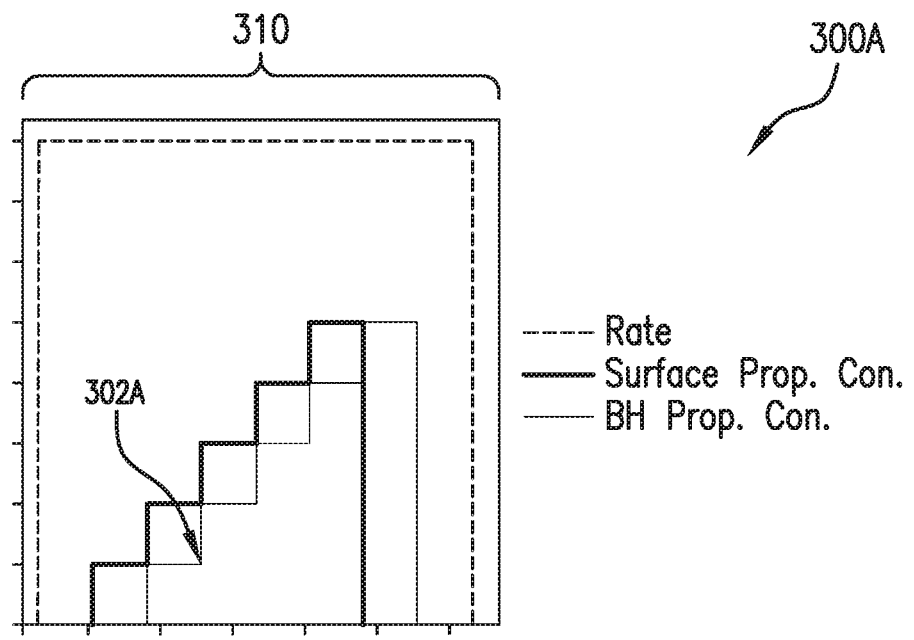
FIGS. 3A and 3B are plot graphs illustrating different parameters of the injected treatment fluid for a current stage of a stimulation treatment under a base treatment profile without partitioning and under an altered treatment profile with partitioning, respectively.

In the event that a bulk diverter drop is deemed not to be necessary when the treatment stage reaches the determination point 202, e.g., if the flow spread is determined to be below or otherwise not meet the predetermined threshold at this point, the treatment may continue as planned, e.g., according to the baseline treatment plan. This is shown by a plot graph 300A in FIG. 3A. In FIG. 3A, the solid lines of the plot graph 300A represent the treatment fluid injected for a treatment stage 310 as it continues past a determination point 302A to the end of the stage 310. In one or more embodiments, if the criterion to make a bulk diverter drop is not met, the flow spread may then be used to determine whether any alternative flow maintenance techniques would be more appropriate. It should be appreciated that any of various flow maintenance techniques may be used as desired for a particular implementation.

Figure 3B:
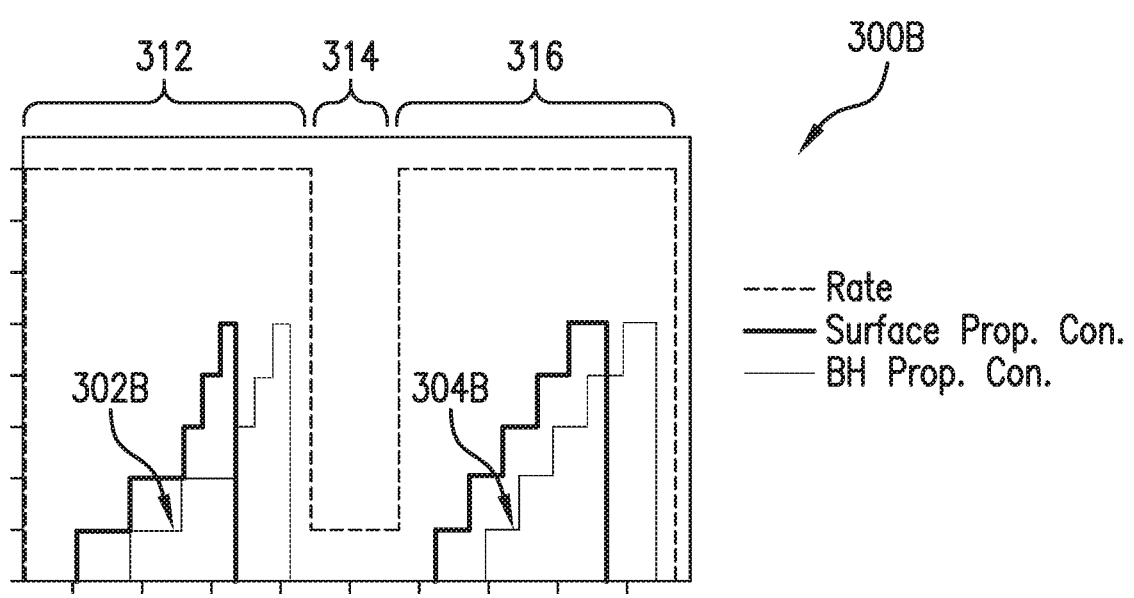

However, if the criterion is met, the remainder of the treatment stage 310 may be partitioned, as shown in FIG. 3B. FIG. 3B is a plot graph 300B in which the treatment stage 310 of FIG. 3A has been partitioned after a determination point 302B into a plurality of treatment cycles 312 and 316, separated by a diversion phase 314. Treatment fluid is injected into formation entry points during the first treatment cycle 312 of the partitioned treatment stage, diverter is dropped during the diversion phase 314, and the remaining treatment fluid is injected during the second treatment cycle 316 of the partitioned stage. Also, as shown in FIG. 3B, the remaining portion of the treatment stage 310 may be further partitioned after a determination point 304B during the second treatment cycle 316. For example, if the criterion for a bulk diverter drop is met again at this second determination point 304B, the partitioning and diversion procedure may be repeated, thereby creating a second diversion phase and third treatment cycle. It should be appreciated that this procedure may be repeated as needed or desired for a given stage as long as the relevant criteria are met.

In one or more embodiments, the number of sufficiently stimulated formation entry points or perforation clusters may be used to determine how to partition the remainder of the treatment stage, i.e., how to allocate the remaining treatment fluid volumes and proppant amongst the treatment cycles of the partitioned treatment stage. One strategy that may be used is to allocate the remaining portion of the treatment fluid and proppant directly to each treatment cycle according to the fraction of entry points or clusters being treated. Table 1 below shows an example of how such a strategy may be used to allocate a remaining portion of the proppant to the treatment cycles of the partitioned treatment stage based on the number of sufficiently stimulated entry points or clusters (SSC) relative to the number of available entry points/clusters (i.e. entry points/clusters not previously blocked or plugged by diverter).

TABLE 1

| Total Proppant Remaining | SSC | Clusters Available | Proppant Allocated to 1st Treatment Cycle | Proppant Allocated to 2nd Treatment Cycle |
|---|---|---|---|---|
| 180,000 | 2 | 6 | 60,000 | 120,000 |
| 120,000 | 1 | 4 | 30,000 | 90,000 |

In this example, N is the number of formation entry points or clusters available to be treated on the current treatment cycle and M is the proppant mass in pounds (lbs) remaining out of the total mass allocated to the current treatment stage. It is assumed for purposes of this example that, initially, N is equal to six and M is equal to 180,000 lbs. Thus, if it is determined that a bulk diverter drop is needed based on the flow spread and that the number of SSC is two, then according to the above strategy, the amount of proppant to be pumped for the remainder of the current treatment stage may be calculated as follows: (SSC/N)*M lbs of proppant (i.e., 2/6*180,000 lbs=60,000 lbs). The amount of remaining proppant to be pumped in the next treatment cycle after the diversion phase may be calculated as follows: (1−SSC/N) *M lbs (i.e., (1−2/6)*180,000=120,000 lbs). After the diversion phase, N is reduced by the number of SSC to become four. If it is determined that a second diverter drop is necessary (and SSC is now determined to be one), the proppant to be pumped before and after the second diversion phase would be calculated as ¼*120,000 lbs=30,000 lbs and (1−¼)*120,000 lbs=90,000 lbs, respectively. It should be appreciated that the allocation strategy described in this example may be modified as needed or desired to take into consideration other factors, e.g., local stress contrasts between different rock layers of the surrounding formation, which may impact the downhole fluid flow distribution.

In cases where diversion is deemed to be necessary, the effectiveness of the diversion in improving the downhole flow distribution may be dependent upon the particular parameters that are used to control the injection of diverter during the diversion phase. Such diversion control parameters may include, for example and without limitation, the amount and concentration of the diverter to be injected into the formation as well as the pumping rate at which the diverter is to be injected. However, it is generally difficult to determine appropriate values for such diversion control parameters prior to a treatment stage.

In one or more embodiments, real-time modeling techniques may be used to determine values of such diversion control parameters for the diversion phase to be performed during each stage of the stimulation treatment along the path of the wellbore through the formation. For example, a diagnostic data model may be used to estimate a response of the diverter on at least one downhole parameter. The downhole parameter may be any parameter whose values may be affected by the injection of diverter into the formation. Examples of such downhole parameters include, but are not limited to, a pressure, a temperature, strain, or an acoustic energy distribution within the subsurface formation.

As will be described in further detail below with respect to FIGS. 4-7, the diagnostic data model may be calibrated or updated in real time based on data relating to the downhole parameter that is obtained at the wellsite during the stimulation treatment. Such data may include, for example, real-time measurements obtained from one or more wellsite data sources during a current stage of the stimulation treatment along the wellbore path. The obtained data may be used to measure or calculate values of the downhole parameter before and after diverter is injected into the formation during the current treatment stage. In this way, the data may be used to monitor an actual response of the diverter on the downhole parameter and compare the actual response with an estimated response using the diagnostic data model. Any difference between the actual and estimated responses that meets or exceeds a specified error tolerance threshold may be used to update the diagnostic data model. This allows the model's accuracy to be improved for estimating the diverter response on the downhole parameter for subsequent diversion phases to be performed during the current or a later treatment stage. Further, the real-time data as applied to the calibrated or updated diagnostic data model allows particular values of the diversion control parameters to be correlated with an expected response of the diverter when injected into the formation according to those parameters.

While the examples in FIGS. 4-7 will be described below in the context of estimating pressure responses for a given amount of diverter, it should be appreciated that the disclosed techniques are not intended to be limited thereto and that these techniques may be applied to other downhole parameters and diversion control parameters. For example, the disclosed real-time modeling techniques may be used to estimate the response of injecting diverter having a particular concentration on formation temperature.

Figure 4:
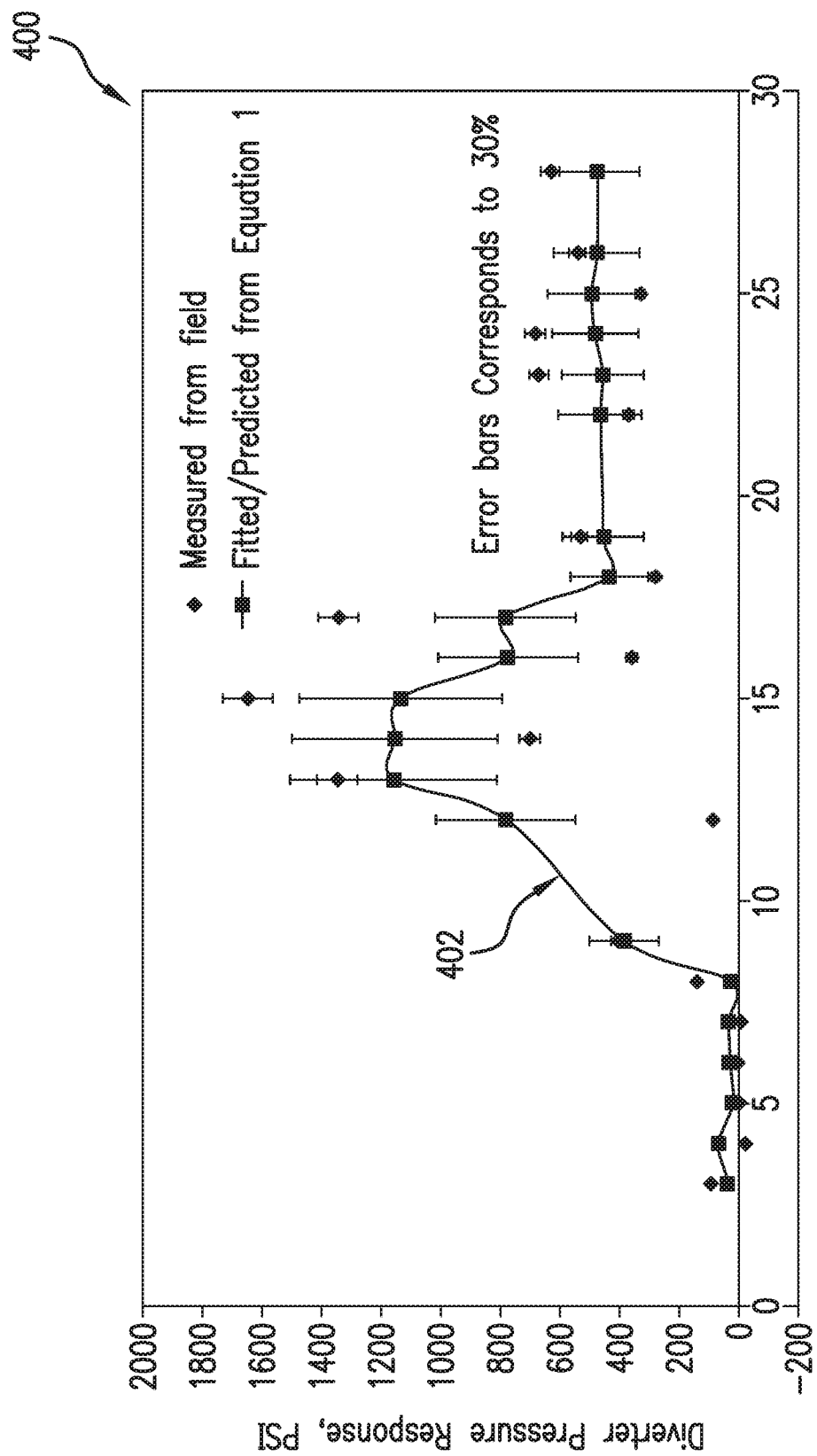
FIG. 4 is a plot graph illustrating estimated and actual or measured responses of diverter on pressure within a formation over different stages of a stimulation treatment.

FIG. 4 is a plot graph 400 illustrating an estimate of the immediate response of diverter on pressure (also referred to herein as the "diversion pressure response" or "DPR") within a formation relative to the actual or measured pressure response over different stages of a stimulation treatment along a wellbore path within a subsurface formation. It should be appreciated that it may not be possible to measure pressure or other downhole parameters directly and that the real-time measurements described herein may be of formation properties used to calculate values of the downhole parameter(s) in question. The actual or measured DPR as shown in the plot graph 400 may be based on, for example, real-time pressure measurements obtained from a combination of downhole and surface pressure sensors at the wellsite, as described above.

As shown in FIG. 4, the plot graph 400 includes a trend line 402 representing the estimated DPR of the diverter over the different treatment stages. The estimated DPR in this example may be based on a diagnostic data model selected for the stimulation treatment within the subsurface formation and data relating to the DPR for each stage of the treatment. Such data may be obtained for a particular treatment stage over multiple preceding stages. The obtained data may then be applied to the diagnostic data model in order to estimate the DPR for the particular treatment stage in question. Thus, for example, the DPR for the tenth stage of the treatment may be based on the diagnostic data model developed from data obtained over the first nine stages of the treatment.

As each treatment stage is performed, the actual or measured DPR may be monitored and compared to the estimated response for that stage. If there is a significant difference (e.g., exceeding a specified error tolerance threshold) between the actual and estimated DPRs, the diagnostic data model may be updated to improve the accuracy of the estimation for subsequent treatment stages or subsequent diversion phases within the same treatment stage. In this way, the real-time data obtained from the field can be used to train and then calibrate or update the diagnostic data model over the course of the stimulation treatment.

In the example shown in FIG. 4, it is assumed that the estimated response for the majority of the treatment stages is within approximately 30% of the actual response based on data measured from the field. However, the trend line 402 for the estimation in this example may be based only on data obtained during a limited subset (e.g., the first nine stages) of the total number of stages to be performed for the stimulation treatment. Accordingly, the accuracy of the model in estimating the diversion pressure response may be further improved by updating the model as each additional stage of the stimulation treatment is performed along the wellbore path.

In one or more embodiments, the diagnostic data model may be updated by adjusting selected diversion control parameters that are represented by the model. The selected diversion control parameters may include any control parameters of the diverter that can affect the type of response expected on pressure (or other downhole parameters of interest) as a result of injecting diverter into the formation according to the selected control parameters. The selected diversion control parameters represented by the diagnostic data model may include, for example and without limitation, diverter amount (A), diverter concentration, and diverter injection rate. In addition to diversion control parameters, the diagnostic data model may also represent other types of parameters including, but not limited to, measured downhole parameters, e.g., breakdown pressure ($P_B$) and average treating pressure ($P_T$), and treatment design parameters, e.g., proppant mass (M). The diagnostic data model used to estimate the diversion pressure response (DPR) based on these parameters may be expressed using Equation (1) as follows:

$$DPR = a(P_B)^{a1} + b(P_T)^{b1} + c(A)^{c1} + d(M)^{d1} \qquad (1)$$

In Equation (1) above, a, b, c, d, a1, b1, c1, and d1 are coefficients that may be used to individually account for the effects of variations in breakdown pressure, average treating pressure, diverter amount, and proppant mass, respectively, in order to fit the diagnostic data model to the real-time data obtained from the field during each stage of the treatment. Accordingly, the process of updating the diagnostic data model in this example may include modifying coefficients associated with one or more of the model's parameters, adding or removing one or more parameters to or from the model, or performing some combination of the foregoing. For purposes of the example as shown in FIG. 4, it will be assumed that the values of the coefficients are as follows: a=−0.3; b=0.25; c=1.04; d=0; a1=1; b1=1; c1=1.28; and d1=1. However, it should be noted that embodiments are not intended to be limited thereto and that the coefficients may be set to any of various values as appropriate or desired for a particular implementation.

The diversion control parameters in Equation (1) may represent input parameters of the diagnostic data model that can be adjusted dynamically to produce a particular diversion pressure response output. The particular diversion pressure response output may be, for example, a desired or target DPR that would increase the chances of a successful fluid flow redistribution, in which the injected treatment fluid is redistributed more uniformly across the formation entry points along the wellbore path. The target DPR may be a single value, e.g., 500 psi, or a range of values, e.g., from 500 psi to 1200 psi.

In one or more embodiments, the updated diagnostic data model may be used to make real-time adjustments to one or more of the model's input parameters in an effort to achieve the target DPR. This may be accomplished by adjusting one or more of the model's input parameters until the DPR that is estimated using the model is equivalent to the desired/target DPR. For example, Equation (1) may be used to calculate the diverter amount required to achieve the target DPR for a given set of real-time measurements for breakdown pressure, average treating pressure, and proppant mass. While this calculated amount of diverter is pumped downhole during the current diversion phase, the actual DPR may be monitored and compared to the target DPR. As described above with respect to the actual and estimated DPRs, any difference between the actual DPR and the target DPR that meets or exceeds an error tolerance threshold may then be used to update or calibrate the diagnostic data model. The error tolerance threshold may be, for example, a specified error tolerance threshold associated with the target response. The specified error tolerance threshold may the same or a different error tolerance threshold than that previously used for the comparison between the estimated response and the actual response of the diverter as measured while the diversion phase is performed within the subsurface formation. Such real-time adjustments to the diagnostic data model allow the accuracy of the model and estimated response using the model to be improved as the treatment progresses along the wellbore path from one stage to the next.

It should be appreciated that the form and particular parameters of Equation (1) may be adjusted as desired for a particular implementation. It should also be appreciated that other diversion control parameters, e.g., cluster spacing, perforations open, perforations scheme, etc., may be taken into consideration in addition to or in place of any of the aforementioned control parameters.

In one or more embodiments, the accuracy of the model may be improved by using only the data obtained during selected stages of the treatment. The data obtained during other stages may be discarded. The discarded data may include, for example, outliers or measurements that are erroneous or not reflective of the actual pressure response that can be expected during the stimulation treatment along the wellbore path.

Figure 5:
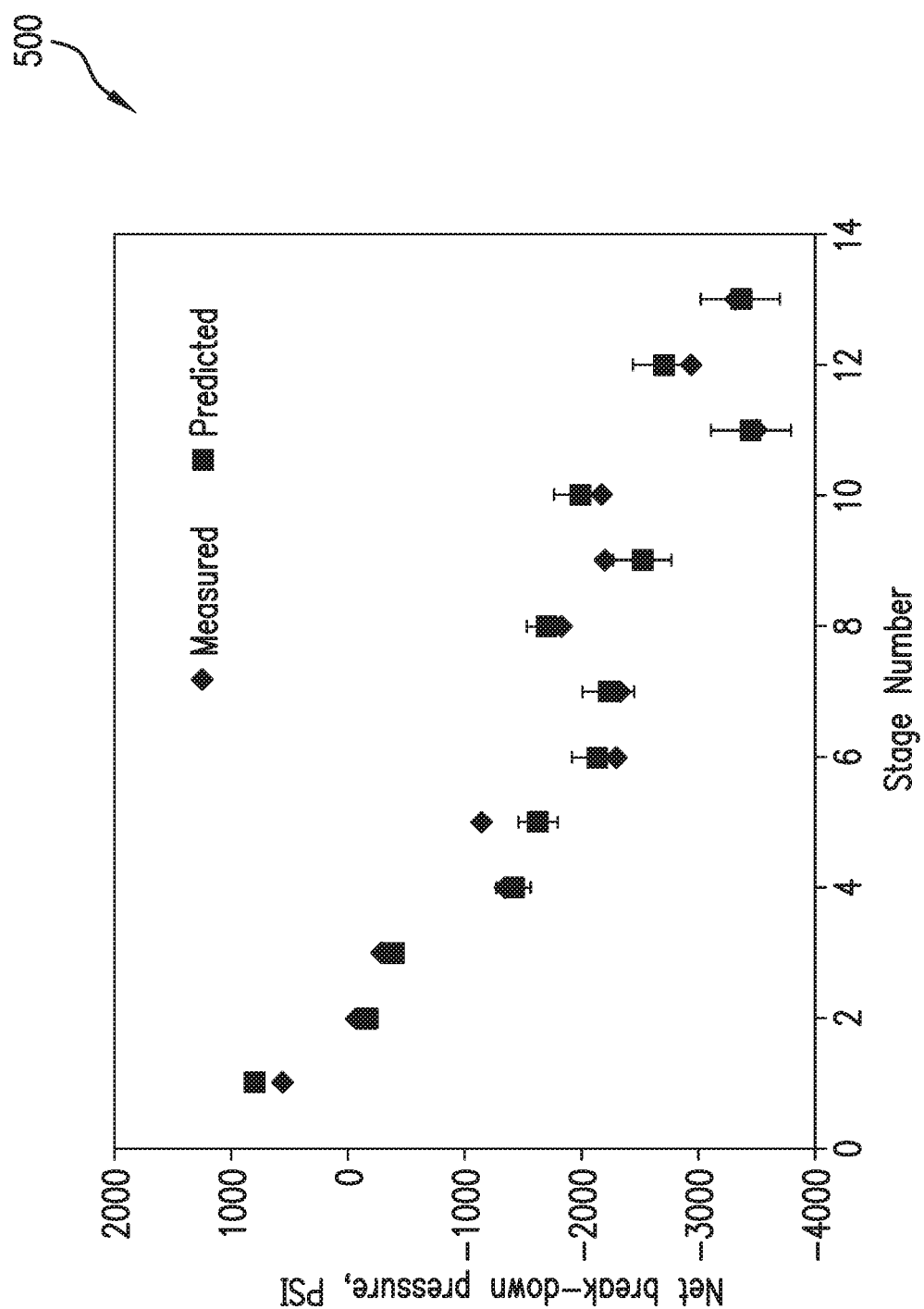
FIG. 5 is a plot graph illustrating an example of estimated and actual/measured responses of diverter on net breakdown pressure within a formation over different stages of a stimulation treatment.

FIG. 5 is a plot graph 500 illustrating an example of estimated and actual/measured responses of diverter on net breakdown pressure within a formation over selected stages of a stimulation treatment. Net breakdown pressure is the difference between the values of breakdown pressure before and after diverter is injected into the formation (e.g., in the form of a bulk diverter drop) during a stage of the treatment. As shown by the plot graph 500, the estimated response for the majority of the treatment stages is much closer (e.g., within 15%) of the actual response based on data measured from the field. The diagnostic data model based on Equation (1) above may be updated and used to estimate the net breakdown pressure response by replacing diverter pressure response with net breakdown pressure.

The values of the coefficients for the purposes of the example as shown in FIG. 5 may be as follows: a=−1.02; b=1.05; c=−0.22; d=0; a1=1; b1=1; c1=1.28; and d1=1. Another example of estimated and actual/measured responses of diverter can be in terms of net average treatment pressure (i.e. post-diverter average treatment pressure minus pre-diverter average treatment pressure) within a formation over selected stages of a stimulation treatment.

Figure 6:
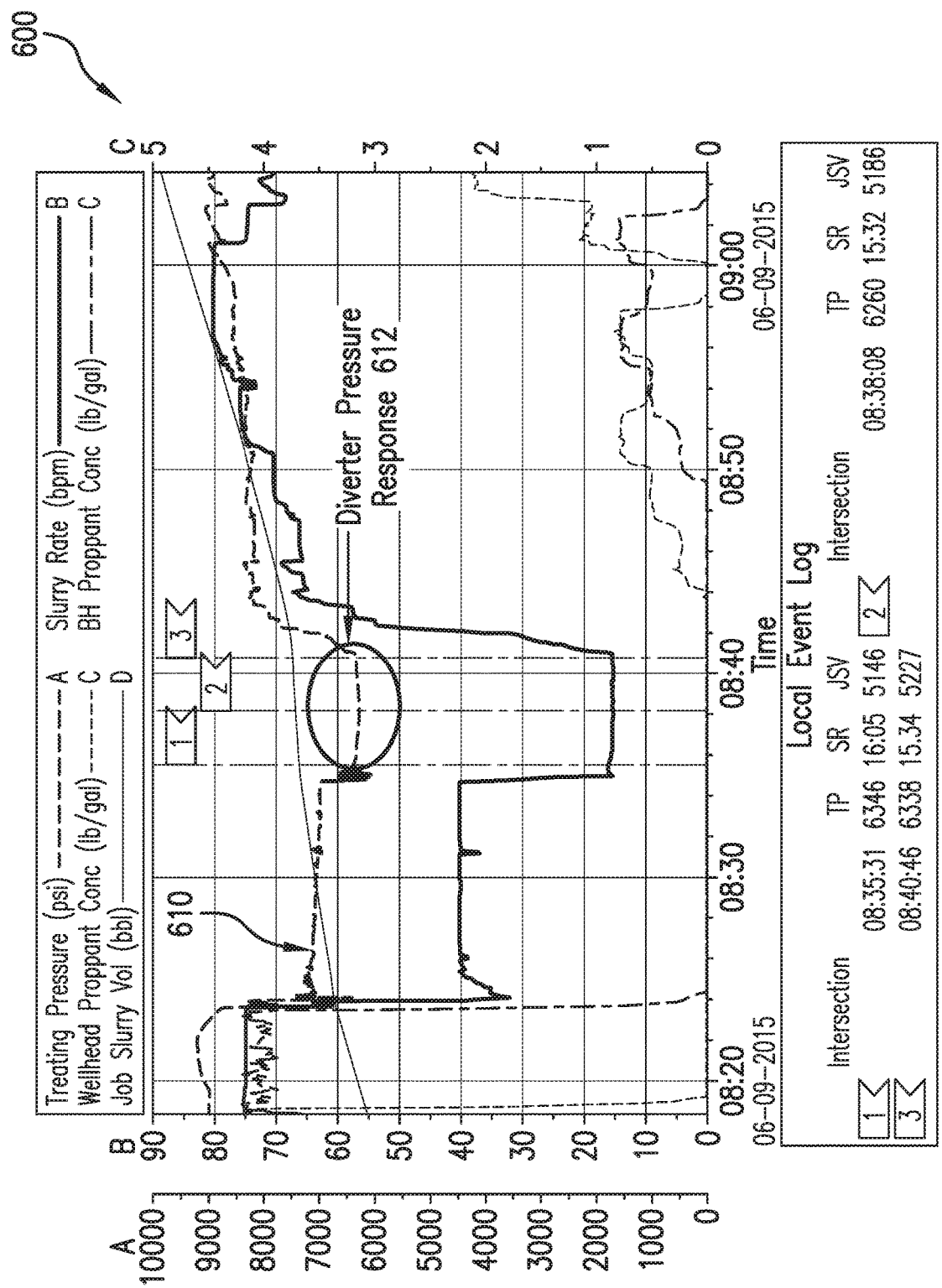
FIG. 6 is a plot graph illustrating an example of a minimal pressure response to diverter injected during a treatment stage.

In some cases, the amount of diverter injected into the formation may be insufficient to produce a positive pressure response or one that exceeds a predetermined minimum response threshold, as shown by the example in FIG. 6. FIG. 6 is a plot graph 600 illustrating an example of a minimal pressure response to diverter injected during a treatment stage. A curve 610 of the plot graph 600 may represent an actual pressure response that is monitored during a current stage of a stimulation treatment along a wellbore path within a subsurface formation. A portion 612 of the pressure response curve 610 may correspond to the actual pressure response during a diversion phase of the stimulation treatment after an initial amount of diverter has been injected into the formation. As indicated by the portion 612 of the pressure response curve 610, the injected diverter produces very little or no pressure response during the diversion phase.

Figure 7:
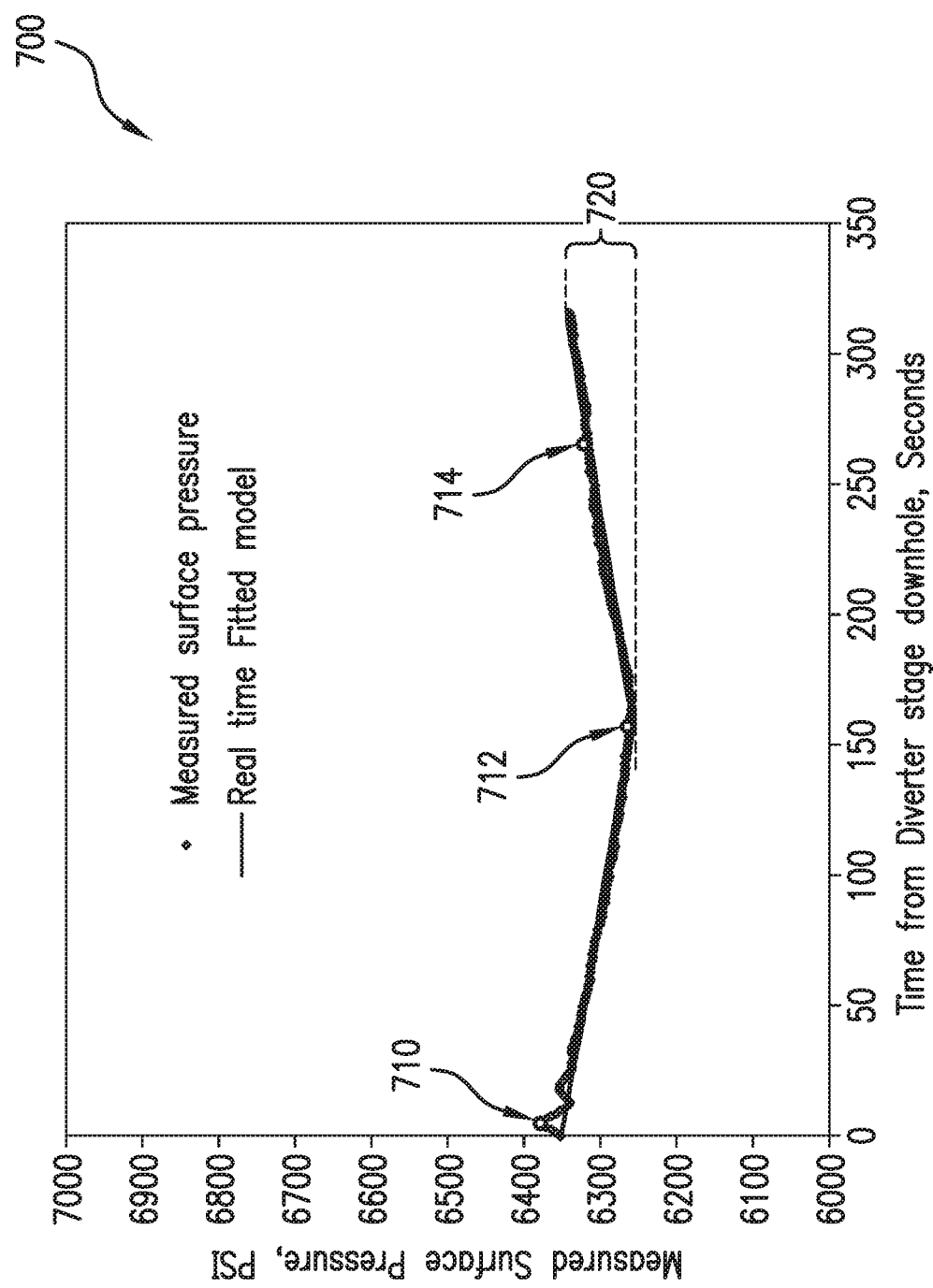
FIG. 7 is a plot graph illustrating the minimal diverter pressure response for the treatment stage of FIG. 6 over time.

FIG. 7 is a plot graph 700 that further illustrates the minimal diverter pressure response during the diversion phase for the treatment stage of FIG. 6. In particular, the plot graph 700 shows the actual pressure response of the injected diverter during the diversion phase relative to the estimated response. For purposes of this example, it will be assumed that 150 pounds (lbs) of diverter was injected into the formation during a first iteration or sub-cycle of the diversion phase. A point 710 of the plot graph 700 may represent the point at which the diverter is first injected into the subsurface formation. A point 712 may represent the point at which the injection of the diverter is complete and all of the diverter (e.g., all 150 lbs.) allotted for the diversion phase has been injected into the formation. A point 714 may represent the point at which a pressure response 720 of the injected diverter is measured. It will be assumed that the pressure response 720 was only 78 psi. If the pressure response 720 is determined to be below the minimum positive pressure response threshold (e.g., 300 psi), another iteration or sub-cycle of the diversion phase may be performed. For the subsequent iteration of the diversion phase, the amount of diverter to be injected may be appropriately adjusted. For example, the amount of diverter to be injected may be determined based on Equation (2):

$$A = \text{Factor} \times \frac{\text{Amt\_Placed}}{\text{Prior\_Pressure\_Response}} \times (\text{Delta} - \text{Prior\_Pressure\_Response}) \quad (2)$$

where Factor may be a predetermined safety factor (0.5) and Delta may be a target pressure response range (e.g., 300 to 1000 pounds per square inch (psi)).

Thus, using Equation (2) and the pressure response values provided above, the diverter amount may be calculated as follows:

$$A = 0.5 \times 150/78 \times (300-78) = 213 \text{ lbs.}$$

Alternatively, a separate real time model can be developed for correlating the diverter pressure response as a function of diverter placement and other diverter controlled parameters as expressed using Equation (3):

$$\text{Pressure Response} = f(\text{Time, Diverter Amt. Injected or Placed, Rate, etc.}) \quad (3)$$

If the pressure response during the second iteration of the diversion phase is again determined to be insufficient or below the minimum response threshold, additional iterations or sub-cycles of the diversion phase may be performed until the required amount of pressure response is observed. An updated diagnostic data model may be developed over the one or more further iterations of the diversion phase in this example. Such an updated data model may also be used to estimate pressure response as a function of the diverter amount and/or other diversion control parameters. As such, the updated diagnostic data model, e.g., according to the example given in Equation (1), may be used in lieu of Equations (2) or (3) to control diverter amount and/or other diversion control parameters over subsequent diverter iterations of the diversion phase in an effort to achieve a target response.

Figure 8:
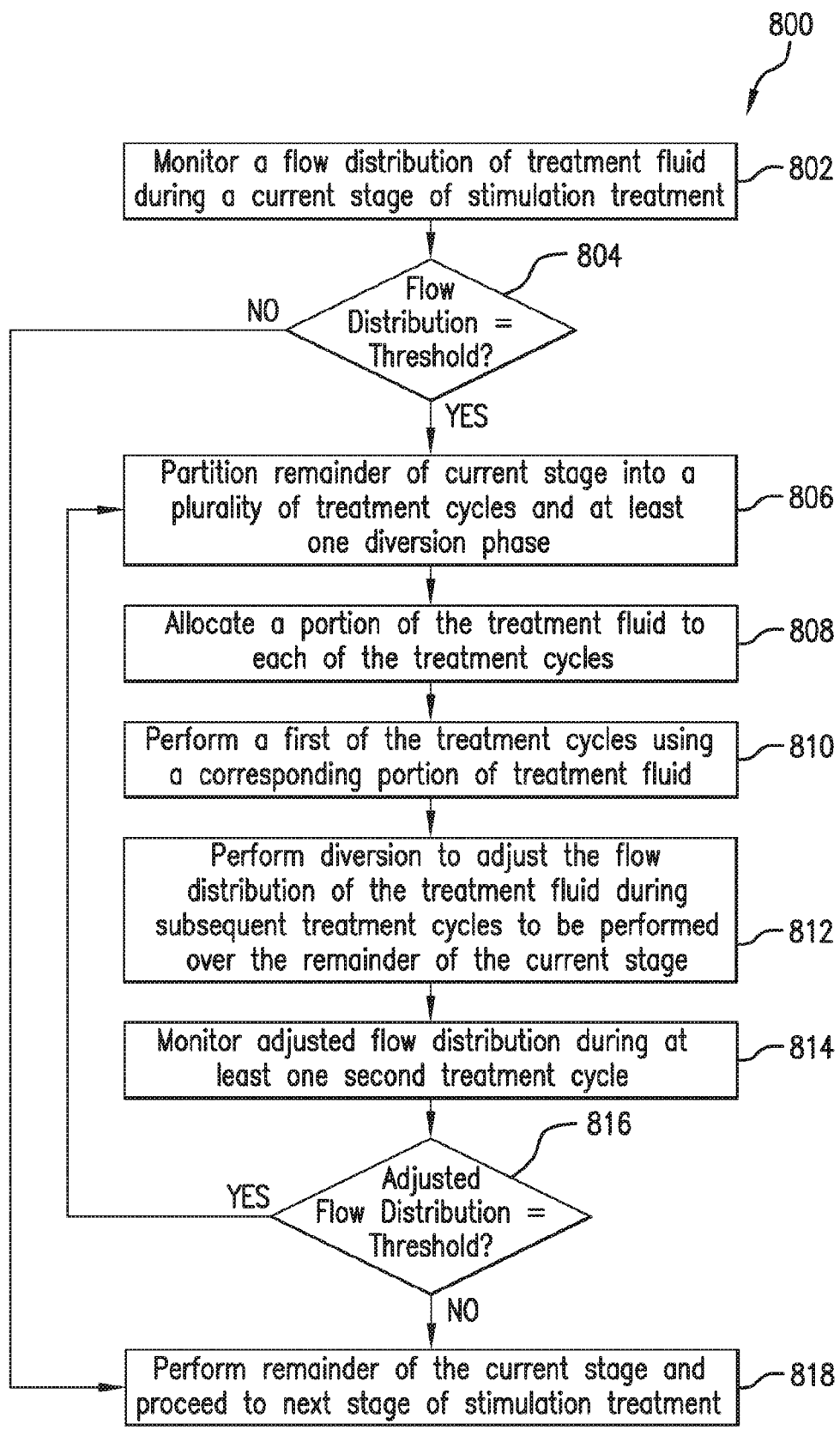
FIG. 8 is a flowchart of an illustrative process for real-time monitoring and diversion based control of downhole flow distribution for stimulation treatments.

FIG. 8 is a flowchart of an illustrative process 800 for real-time monitoring and control of downhole fluid flow and distribution using diversion during stimulation treatments. For discussion purposes, process 800 will be described using well system 100 of FIG. 1, as described above. However, process 800 is not intended to be limited thereto. The stimulation treatment in this example is assumed to be a multistage stimulation treatment, e.g., a multistage hydraulic fracturing treatment, in which each stage of the treatment is conducted along a portion of a wellbore path (e.g., one or more sections 118 along the wellbore 102 of FIG. 1, as described above). As will be described in further detail below, process 800 may be used to monitor and control the downhole flow distribution using diversion in real-time during each stage of the stimulation treatment along a planned trajectory of horizontal wellbore (e.g., wellbore 102 of FIG. 1, as described above) within a subsurface formation. The subsurface formation may be, for example, tight sand, shale, or other type of rock formation with trapped deposits of unconventional hydrocarbon resources, e.g., oil and/or natural gas. The subsurface formation or portion thereof may be targeted as part of a treatment plan for stimulating the production of such resources from the rock formation. Accordingly, process 800 may be used to appropriately adjust the treatment plan in real-time so as to improve the downhole flow distribution of the injected treatment fluid over each stage of the stimulation treatment.

Process 800 begins in block 802, which includes monitoring a flow distribution of treatment fluid during a current stage of a stimulation treatment. The monitoring in block 802 may include determining the flow distribution (or indications thereof) based on real-time measurements obtained from one or more data sources located at the wellsite. In one or more embodiments, the real-time measurements may be obtained from fiber-optic sensors disposed within the wellbore. For example, the fiber-optic sensors may be coupled to at least one of a drill string, a coiled tubing string, tubing, a casing, a wireline, or a slickline disposed within the wellbore. Real-time measurements may also be obtained from other data sources at the wellsite. As described above, such other data sources may include, but are not limited to, micro-seismic sensors, pressure sensors, and tiltmeters. Such data sources may be located downhole or at the surface of the wellsite. In one or more embodiments, the flow distribution may be determined by applying the real-time measurements obtained from one or more of the aforementioned data sources to a geomechanics model of surrounding formations along the wellbore path. In some implementations, the flow distribution may be determined by monitoring a distribution of particle tracers along the wellbore path, as described above.

In block 804, it is determined whether or not the monitored flow distribution meets a threshold. As described above, such a threshold may be a qualitative or quantitative value representing a bulk diversion criterion used to determine whether or not to partition a current treatment stage using diversion. Such a value may be determined prior to the beginning of the current stage based on various factors that may affect the downhole flow distribution. Also, as noted above, while the threshold may be described herein as a single value, it should be appreciated that embodiments are not intended to be limited thereto and that the threshold may be a range of values, e.g., from a minimum threshold value to a maximum threshold value. In one or more embodiments, block 804 may include comparing a flow spread with the bulk diversion criterion. The flow spread may be determined based on real-time measurements collected downhole by one or more data sources, e.g., fiber-optic or micro-seismic sensors.

In one or more embodiments, the threshold or bulk diversion criterion used in block 804 may be a coefficient of variation, as expressed by Equation (4):

$$c_v = \sigma/\mu \quad (4)$$

where $\sigma$ is the standard deviation of the flow distribution and $\mu$ is the mean of the flow distribution, which is equivalent to the flow into one formation entry point if all entry points were accepting equal flow distribution. The flow distribution may be determined to meet the threshold if the calculated coefficient of variation ($c_v$) meets or exceeds a predetermined value (e.g., 0.35 or 0.5).

In one or more embodiments, the threshold or bulk diversion criterion used in block 804 may instead be a flow uniformity index (UI), as expressed by Equation (5):

$$UI = 1 - \sigma/\mu \quad (5)$$

For example, using Equation (5), the flow distribution may meet the threshold if the calculated uniformity index (UI) is at or below a predetermined value (e.g., 0.65 or 0.5).

If it is determined in block 804 that the flow distribution does not meet the threshold, then process 800 proceeds directly to block 818 and the treatment stage proceeds under the normal course, e.g., according to a baseline treatment plan. In some implementations, process 800 may include additional processing blocks (not shown) for initiating flow maintenance for the injection of the treatment fluid into the formation entry points while performing the remainder of the current stage. It should be appreciated that any of various flow maintenance techniques may be used as desired for a particular implementation.

However, if it is determined in block 804 that the monitored flow distribution meets the threshold, process 800 proceeds to block 806, which includes partitioning a remainder of the current stage of the stimulation treatment into a plurality of treatment cycles. The plurality of treatment cycles includes at least one diversion phase for diverting the treatment fluid to be injected away from one or more of the formation entry points between consecutive treatment cycles.

In block 808, a portion of the treatment fluid to be injected into the formation entry points is allocated to each of the plurality of treatment cycles of the partitioned current stage. In block 810, a first of the treatment cycles is performed using a corresponding portion of the treatment fluid that was allocated in block 808.

Process 800 then proceeds to block 812, which includes performing diversion in order to adjust the flow distribution of the treatment fluid to be injected into the formation entry points during subsequent treatment cycles to be performed over the remainder of the current stage of the stimulation treatment. In one or more embodiments, block 812 may include injecting or otherwise deploying diverter material into the formation entry points. The diverter material may be deployed as a bulk diverter drop during a diversion phase performed after the first treatment cycle and before at least one second treatment cycle (e.g., treatment cycle 316 of FIG. 3B, as described above) of the partitioned current stage of the treatment in this example.

In one or more embodiments, the diversion in block 812 may be performed based on one or more control parameters that dictate the characteristics of the diverter and how it is injected into the formation during the diversion phase. As described above, such diversion control parameters may include, for example and without limitation, an amount, a concentration, and a pumping rate of the diverter to be injected into the subsurface formation. Also, as described above and as will be described in further detail below with respect to FIG. 9, real-time modeling techniques may be used to determine appropriate values for one or more of the diversion control parameters during each stage of the stimulation treatment.

Figure 9:
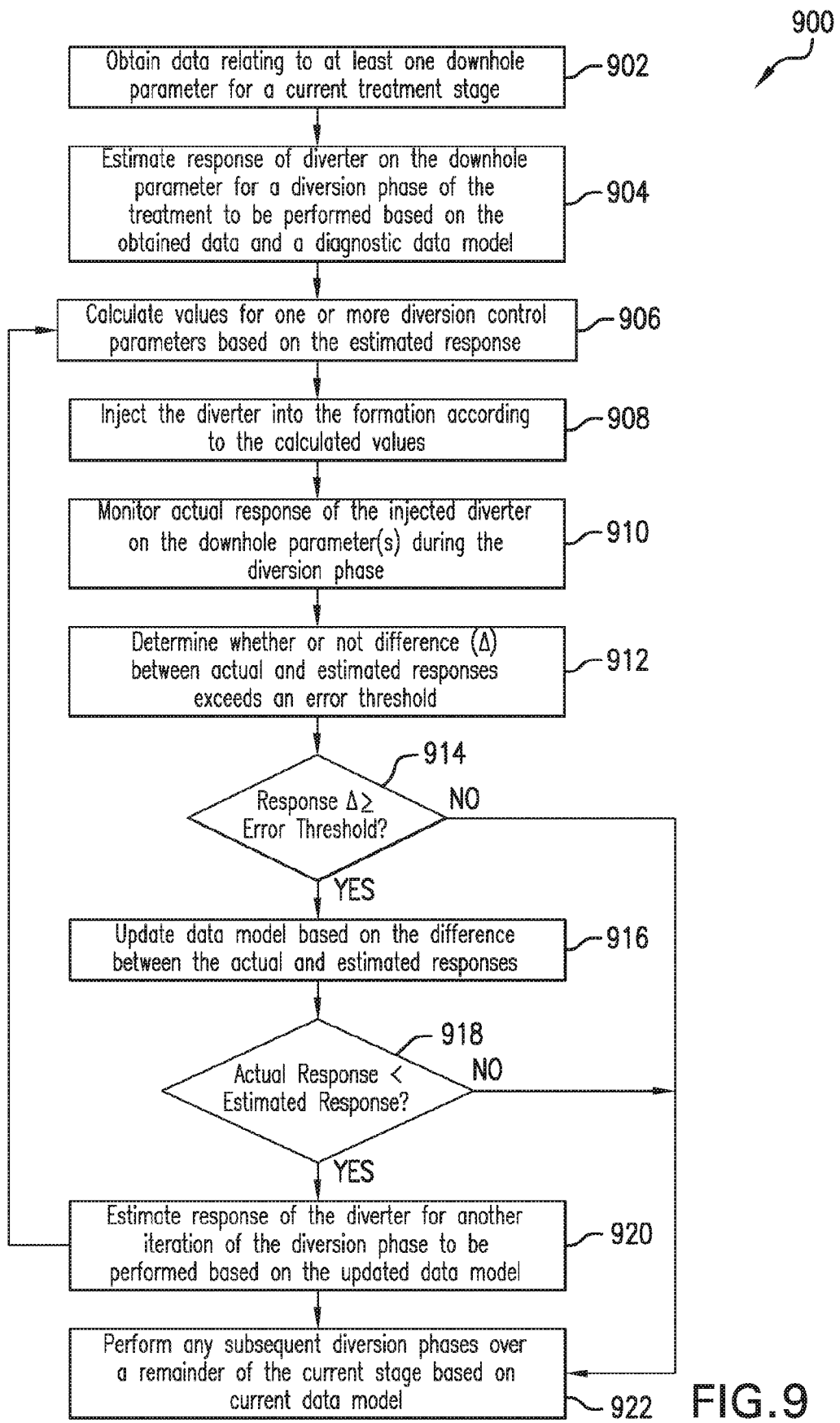
FIG. 9 is a flowchart of an illustrative process for controlling diverter placement during stimulation treatments.

FIG. 9 is a flowchart of an illustrative process 900 for controlling diverter placement based on a diagnostic data model used to determine values for one or more of the diversion control parameters during the current stage of the stimulation treatment. Like process 800 of FIG. 8, process 900 will be described using well system 100 of FIG. 1, as described above, for discussion purposes only and is not intended to be limited thereto. For purposes of the example of FIG. 9, it is assumed that the current stage of the stimulation treatment includes at least one diversion phase for injecting diverter into the subsurface formation along the portion of the wellbore. For example, the current stage of the stimulation treatment may include a plurality of treatment cycles, and the diversion phase may be performed between consecutive treatment cycles of the current stage, e.g., between a first and a second of the plurality of treatment cycles.

Process 900 begins in block 902, which includes obtaining data relating to at least one downhole parameter for a current stage of the stimulation treatment along a portion of a wellbore within a subsurface formation. The downhole parameter may be, for example, at least one of a pressure, a temperature, or an acoustic energy distribution within the subsurface formation along the portion of the wellbore. The data relating to the downhole parameter may include real-time measurements obtained from one or more wellsite data sources. In one or more embodiments, the real-time measurements may include pressure measurements obtained from pressure sensors at a surface of the wellbore, and the diagnostic data model is used to estimate a pressure response of the diverter to be injected into the subsurface formation. Additionally or alternatively, the real-time measurements may be obtained from fiber-optic sensors disposed within the wellbore, and the fiber-optic sensors are used to perform at least one of a distributed acoustic sensing, distributed strain sensing, or a distributed temperature sensing along a path of the wellbore through the subsurface formation. In one or more embodiments, block 902 of process 900 may also include comparing the values of one or more of the measured parameters against a range of values observed for those parameters during previous stages of the stimulation treatment in order to better assess the impact of each parameter on the accuracy of the diagnostic data model for the current stage.

Process 900 then proceeds to block 904, which includes estimating a response of the diverter to be injected into the subsurface formation on the downhole parameter, based on the obtained data and a diagnostic data model selected for the stimulation treatment within the subsurface formation. In block 906, values for one or more diversion control parameters are calculated based on the estimated response from block 904. The diversion control parameter(s) in this example may be selected from a set of diversion control parameters associated with the diverter to be injected into the formation. In some implementations, the diagnostic data model may also be used to estimate a fluid flow redistribution response of the diverter to be injected into the subsurface formation, based on the real-time measurements obtained from the fiber-optic sensors, as described above. In one or more embodiments, the diagnostic data model used in blocks 904 and 906 may be a linear or nonlinear model relating real-time measurements, diverter control parameters, and diverter response. In some implementations, the form of the model may be determined through any of various online machine learning techniques. Alternatively, the diagnostic data model may be a linear or nonlinear model generated from historical data acquired from a previously completed well in the hydrocarbon producing field.

In block 908, the diverter is injected into the subsurface formation via formation entry points along the portion of the wellbore to perform the diversion phase according to the calculated values of the one or more diversion control parameters. An actual response of the injected diverter on the downhole parameter may then be monitored in block 910 during the diversion phase.

In block 912, a determination is made as to whether or not any difference between the actual response and the estimated response of the diverter on the downhole parameter exceeds an error tolerance threshold. If it is determined in block 912 that a difference between the actual response and the estimated response does not exceed the error threshold, process 900 proceeds directly to block 922, which includes performing any subsequent diversion phases over a remainder of the current stage of the stimulation treatment, based on the current data model. However, if it is determined in block 912 that a difference between the actual response and the estimated response exceeds the error threshold, process 900 proceeds to block 916, which includes updating the diagnostic data model based on the difference. In one or more embodiments, the updating in block 916 may include modifying the functional form of the diagnostic data model, adding or deleting specific parameters represented by the model, and/or calibrating one or more of the model's parameter coefficients, as described above.

In block 918, another determination is made as to whether or not the actual response is less than the estimated response. If it is determined that the actual response is less than the estimated response, process 900 proceeds to block 920, which includes estimating a response of the diverter for another iteration of the diversion phase to be performed based on the diagnostic data model as updated in block 916.

After block 920, process 900 returns to block 906 to calculate values of the diversion control parameters that will be used to perform the subsequent iteration of the diversion phase. The operations in blocks 920, 906, 908, 910, 912, 914, 916, and 918 may be repeated over one or more subsequent iterations of the diversion phase until the difference between the estimated and actual responses of the diverter on the downhole parameter is within the error tolerance threshold. Thus, the diagnostic data model may be further updated over one or more subsequent iterations of the diversion phase after block 918, when the actual response is determined to be less than the estimated response. Otherwise, process 900 may proceed to block 922, in which any subsequent diversion phases are performed over the remainder of the current treatment stage, based on the updated diagnostic data model. The updated diagnostic data model may be used, for example, to adjust one or more diversion control parameters, e.g., at least one of the amount, the concentration, or the pumping rate of the diverter to be injected, for performing each of the subsequent diversion phases that remain during the current treatment stage. If no subsequent diversion phases are needed over the remainder of the current treatment stage, any remaining treatment cycles (e.g., a second of the plurality of treatment cycles) following the diversion phase may be performed instead.

In one or more embodiments, process 900 may include additional blocks (not shown) in which the updated diagnostic data model may be used to determine a desired or target response of the diverter on the downhole parameter. Values for the one or more diversion control parameters may then be calculated based on the target response.

Returning to process 800 of FIG. 8, once the diversion in block 812 is performed as described above, process 800 proceeds to block 814. In block 814, the adjusted flow distribution is monitored during the second treatment cycle of the partitioned current stage. In one or more embodiments, the diversion in block 812 may be performed in order to adjust the flow distribution such that it no longer meets the threshold (or bulk diversion criterion, as described above). Accordingly, block 816 may include determining whether the adjusted flow distribution being monitored still meets the threshold or bulk diversion criterion as described above. If it is determined in block 816 that the adjusted flow distribution no longer meets the threshold, then process 800 proceeds to block 818. Block 818 includes performing the remainder of the current stage, including any remaining treatment cycles, and proceeding to the next stage of the stimulation treatment to be performed. However, if it is determined in block 816 that the adjusted flow distribution meets the threshold, process 800 returns to block 806 to further partition the remainder of the current stage to be performed into additional treatment cycles with an intermediary diversion phase between consecutive treatment cycles as before. Blocks 808, 810, 812, 814, and 816 are then repeated until it is determined that the adjusted (or readjusted) flow distribution no longer meets the threshold for the remainder of the current stage of the stimulation treatment.

Alternatively, process 800 may proceed to the above-described blocks (not shown) for initiating flow maintenance for treatment fluid injections over the remainder of the current stage of the multistage stimulation treatment, without performing any partitioning (block 806) or allocating (block 808).

In contrast with conventional solutions, process 800 allows different types of real-time measurements to be used to make decisions on whether to partition a stimulation treatment during the treatment itself. This allows for better optimization of the treatment as intra-stage effects on formation entry point or perforation cluster and fracture efficiency can be accounted for in the treatment design, allowing for better partitioning of the treatment (when necessary), more efficient fracture geometries, and a more effective stimulation treatment overall. Other advantages of process 800 over conventional solutions include, but are not limited to, maximizing cluster efficiency while minimizing unnecessary use of treatment fluid, proppant, diverter, and other material pumped over the entire wellbore, thereby reducing waste and providing additional cost savings for the wellsite operator.

Figure 10:
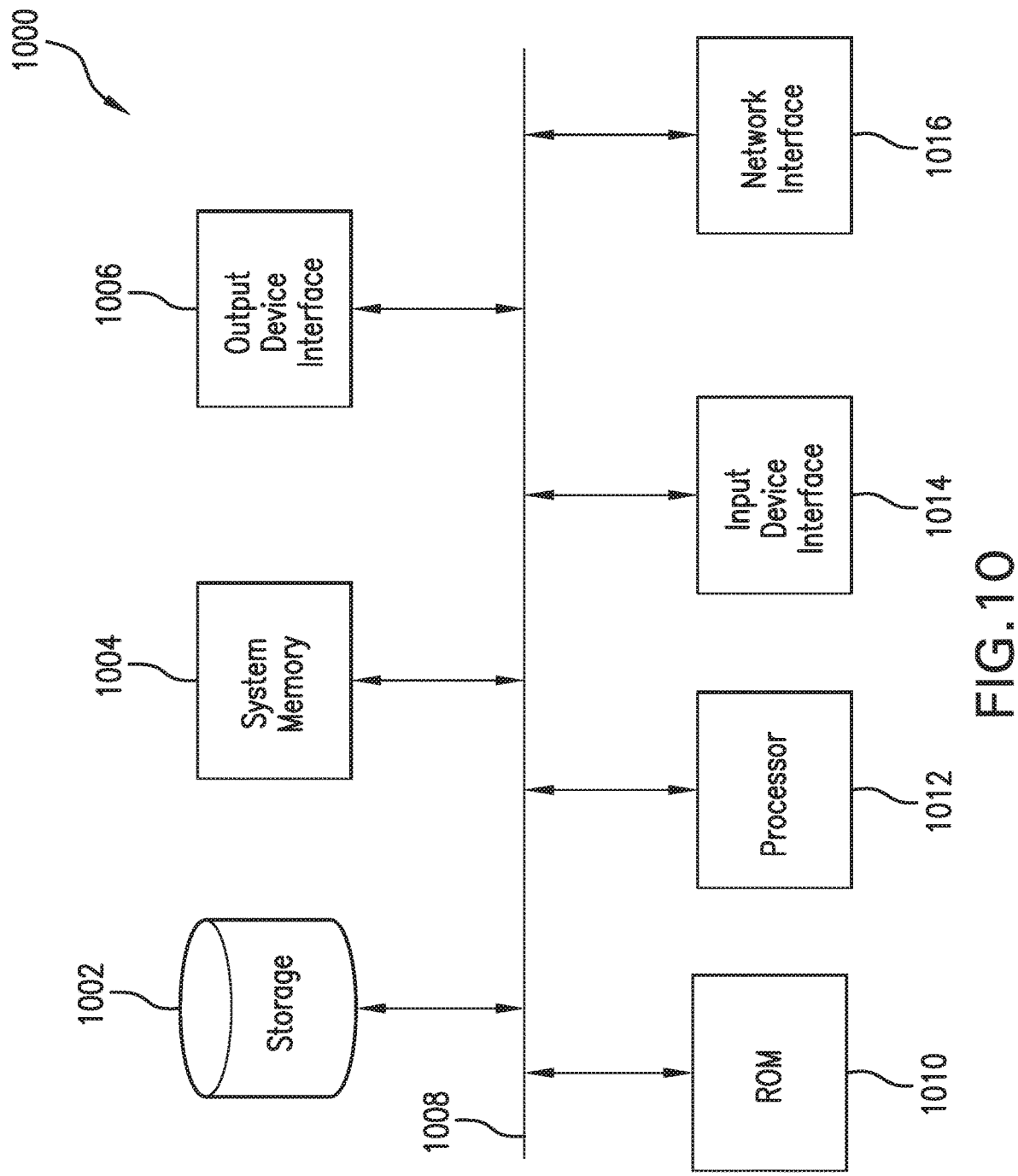
FIG. 10 is a block diagram of an illustrative computer system in which embodiments of the present disclosure may be implemented.

FIG. 10 is a block diagram of an exemplary computer system 1000 in which embodiments of the present disclosure may be implemented. For example, the injection control subsystem 111 (or data processing components thereof) of FIG. 1 and the steps of processes 800 and 900 of FIGS. 8 and 9, respectively, as described above, may be implemented using system 1000. System 1000 can be a computer, phone, PDA, or any other type of electronic device. Such an electronic device includes various types of computer readable media and interfaces for various other types of computer readable media. As shown in FIG. 10, system 1000 includes a permanent storage device 1002, a system memory 1004, an output device interface 1006, a system communications bus 1008, a read-only memory (ROM) 1010, processing unit(s) 1012, an input device interface 1014, and a network interface 1016.

Bus 1008 collectively represents all system, peripheral, and chipset buses that communicatively connect the numerous internal devices of system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of system 1000. Permanent storage device 1002, on the other hand, is a read-and-write memory device. This device is a non-volatile memory unit that stores instructions and data even when system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such a random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for computer aided pipe string design based on existing string designs in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the system 1000. Input devices used with input device interface 1014 include, for example, alphanumeric, QWERTY, or T9 keyboards, microphones, and pointing devices (also called "cursor control devices"). Output device interfaces 1006 enables, for example, the display of images generated by the system 1000. Output devices used with output device interface 1006 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 10, bus 1008 also couples system 1000 to a public or private network (not shown) or combination of networks through a network interface 1016. Such a network may include, for example, a local area network ("LAN"), such as an Intranet, or a wide area network ("WAN"), such as the Internet. Any or all components of system 1000 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, the steps of processes 800 and 900 of FIGS. 8 and 9, respectively, as described above, may be implemented using system 1000 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for controlling diverter placement during stimulation treatments. In one embodiment of the present disclosure, a computer-implemented method of controlling diverter placement during stimulation treatments includes: obtaining data relating to at least one downhole parameter for a current stage of a stimulation treatment along a portion of a wellbore within a subsurface formation, the current stage including at least one diversion phase for injecting diverter into the subsurface formation along the portion of the wellbore; estimating a response of the diverter to be injected into the subsurface formation on the downhole parameter, based on the obtained data and a diagnostic data model selected for the stimulation treatment within the subsurface formation; calculating values for one or more diversion control parameters, based on the estimated response; injecting the diverter into the subsurface formation via formation entry points along the portion of the wellbore to perform the diversion phase according to the calculated values of the one or more diversion control parameters; monitoring an actual response of the injected diverter on the downhole parameter during the diversion phase; upon determining that a difference between the actual response and the estimated response of the diverter on the downhole parameter exceeds an error tolerance threshold, updating the diagnostic data model based on the difference, wherein the diagnostic data model is further updated over one or more subsequent iterations of the diversion phase when the actual response is less than the estimated response; and performing subsequent diversion phases over a remainder of the current stage of the stimulation treatment, based on the updated diagnostic data model. Further, a computer-readable storage medium with instructions stored therein has been described, where the instructions when executed by a computer cause the computer to perform a plurality of functions, including functions to: obtain data relating to at least one downhole parameter for a current stage of a stimulation treatment along a portion of a wellbore within a subsurface formation, the current stage including at least one diversion phase for injecting diverter into the subsurface formation along the portion of the wellbore; estimate a response of the diverter to be injected into the subsurface formation on the downhole parameter, based on the obtained data and a diagnostic data model selected for the stimulation treatment within the subsurface formation; calculate values for one or more diversion control parameters, based on the estimated response; inject the diverter into the subsurface formation via formation entry points along the portion of the wellbore to perform the diversion phase according to the calculated values of the one or more diversion control parameters; monitor an actual response of the injected diverter on the downhole parameter during the diversion phase; determine that a difference between the actual response and the estimated response of the diverter on the downhole parameter exceeds an error tolerance threshold; update the diagnostic data model based on the difference, based on the determination, wherein the diagnostic data model is further updated over one or more subsequent iterations of the diversion phase when the actual response is less than the estimated response; and perform subsequent diversion phases over a remainder of the current stage of the stimulation treatment, based on the updated diagnostic data model.

For the foregoing embodiments, the downhole parameter is at least one of a pressure, a temperature, strain, or an acoustic energy distribution within the subsurface formation along the portion of the wellbore. The data relating to the downhole parameter includes real-time measurements obtained from one or more wellsite data sources. The real-time measurements may include pressure measurements obtained from pressure sensors at a surface of the wellbore, and the diagnostic data model is used to estimate a pressure response of the diverter to be injected into the subsurface formation. The real-time measurements may also be obtained from fiber-optic sensors disposed within the wellbore, and the fiber-optic sensors are used to perform at least one of a distributed acoustic sensing, distributed strain sensing, or a distributed temperature sensing along a path of the wellbore through the subsurface formation. The diagnostic data model is used to estimate a fluid flow distribution response of the diverter to be injected into the subsurface formation, based on the real-time measurements obtained from the fiber-optic sensors. The one or more diversion control parameters include one or more of an amount, a concentration, and a pumping rate of the diverter to be injected into the subsurface formation. The updated diagnostic data model is used to adjust at least one of the amount, the concentration, or the pumping rate of the diverter to be injected for performing each of the subsequent diversion phases.

Further, the foregoing embodiments may include any one of the following functions, operations or elements, alone or in combination with each other: comparing the estimated response to a target response of the diverter to be injected into the subsurface formation on the downhole parameter; determining whether or not a difference between the estimated response and the target response exceeds a specified error tolerance threshold associated with the target response, based on the comparison; when the difference between the estimated response and the target response is determined to exceed the specified error tolerance threshold associated with the target response, adjusting the values of the one or more diversion control parameters until the difference between the estimated response and the target response no longer exceeds the specified error tolerance threshold; repeating the estimating, calculating, injecting, monitoring, and updating over each of the one or more subsequent iterations of the diversion phase, until the difference between the estimated response of the diverter on the downhole parameter and the actual response being monitored is determined not to exceed the error tolerance threshold; and repeating the estimating, calculating, injecting, monitoring, and updating as each of the subsequent diversion phases is performed over the remainder of the current stage of the stimulation treatment. The current stage of the stimulation treatment includes a plurality of treatment cycles, the diversion phase is performed after a first of the plurality of treatment cycles, and when the difference is determined not to exceed the error tolerance threshold, a second of the plurality of treatment cycles may be performed following the diversion phase for the remainder of the current stage of the stimulation treatment.

Likewise, a system has been described, which includes at least one processor and a memory coupled to the processor that has instructions stored therein, which when executed by the processor, cause the processor to perform functions, including functions to: obtain data relating to at least one downhole parameter for a current stage of a stimulation treatment along a portion of a wellbore within a subsurface formation, the current stage including at least one diversion phase for injecting diverter into the subsurface formation along the portion of the wellbore; estimate a response of the diverter to be injected into the subsurface formation on the downhole parameter, based on the obtained data and a diagnostic data model selected for the stimulation treatment within the subsurface formation; calculate values for one or more diversion control parameters, based on the estimated response; inject the diverter into the subsurface formation via formation entry points along the portion of the wellbore to perform the diversion phase according to the calculated values of the one or more diversion control parameters; monitor an actual response of the injected diverter on the downhole parameter during the diversion phase; determine that a difference between the actual response and the estimated response of the diverter on the downhole parameter exceeds an error tolerance threshold; update the diagnostic data model based on the difference, based on the determination, wherein the diagnostic data model is further updated over one or more subsequent iterations of the diversion phase when the actual response is less than the estimated response; and perform subsequent diversion phases over a remainder of the current stage of the stimulation treatment, based on the updated diagnostic data model.

In one or more embodiments of the foregoing system, the downhole parameter is at least one of a pressure, a temperature, strain, or an acoustic energy distribution within the subsurface formation along the portion of the wellbore. The data relating to the downhole parameter includes real-time measurements obtained from one or more wellsite data sources. The real-time measurements may include pressure measurements obtained from pressure sensors at a surface of the wellbore, and the diagnostic data model is used to estimate a pressure response of the diverter to be injected into the subsurface formation. The real-time measurements may also be obtained from fiber-optic sensors disposed within the wellbore, and the fiber-optic sensors are used to perform at least one of a distributed acoustic sensing, distributed strain sensing, or a distributed temperature sensing along a path of the wellbore through the subsurface formation. The diagnostic data model is used to estimate a fluid flow distribution response of the diverter to be injected into the subsurface formation, based on the real-time measurements obtained from the fiber-optic sensors. The one or more diversion control parameters include one or more of an amount, a concentration, and a pumping rate of the diverter to be injected into the subsurface formation. The updated diagnostic data model is used to adjust at least one of the amount, the concentration, or the pumping rate of the diverter to be injected for performing each of the subsequent diversion phases. When the actual response is less than the estimated response, the estimation, calculation, injection, monitoring, and updating functions are repeated over each of the one or more subsequent iterations of the diversion phase, until the difference between the estimated response of the diverter on the downhole parameter and the actual response being monitored is determined not to exceed the error tolerance threshold. Further, the estimation, calculation, injection, monitoring, and updating functions are repeated as each of the subsequent diversion phases is performed over the remainder of the current stage of the stimulation treatment.

Further, the functions performed by the processor may include functions to: compare the estimated response to a target response of the diverter to be injected into the subsurface formation on the downhole parameter; determine whether or not a difference between the estimated response and the target response exceeds a specified error tolerance threshold associated with the target response, based on the comparison; when the difference between the estimated response and the target response is determined to exceed the specified error tolerance threshold associated with the target response, adjust the values of the one or more diversion control parameters until the difference between the estimated response and the target response no longer exceeds the specified error tolerance threshold; and when the difference is determined not to exceed the error tolerance threshold, perform a second of a plurality of treatment cycles for the remainder of the current stage of the stimulation treatment, following the diversion phase, which is performed after a first of the plurality of treatment cycles.

While specific details about the above embodiments have been described, the above hardware and software descriptions are intended merely as example embodiments and are not intended to limit the structure or implementation of the disclosed embodiments. For instance, although many other internal components of the system 1000 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A method of controlling diverter placement during stimulation treatments, the method comprising:

obtaining data relating to at least one downhole parameter for a current stage of a stimulation treatment along a portion of a wellbore within a subsurface formation, the current stage including at least one diversion phase for a diverter to be injected into the subsurface formation along the portion of the wellbore;

estimating a response of the diverter on the downhole parameter, based on the obtained data and a diagnostic data model selected for the at least one diversion phase of the stimulation treatment within the subsurface formation;

calculating values for one or more diversion control parameters, based on the estimated response;

injecting the diverter into the subsurface formation via formation entry points along the portion of the wellbore to perform the diversion phase according to the calculated values of the one or more diversion control parameters;

monitoring an actual response of the injected diverter on the downhole parameter during the diversion phase;

upon determining that a difference between the actual response and the estimated response of the diverter on the downhole parameter exceeds an error tolerance threshold, updating the diagnostic data model based on the difference, wherein the updated diagnostic data model is used to update the estimated response of the diverter, and the updated response of the diverter is used to update the values of the one or more diversion control parameters for one or more subsequent diversion phases to be performed along the wellbore; and performing the one or more subsequent diversion phases over at least one of a remainder of the current stage or a subsequent stage of the stimulation treatment along the wellbore, based on the updated values of the one or more diversion control parameters.

2. The method of claim 1, wherein the calculating further comprises:

comparing the estimated response to a target response of the diverter to be injected into the subsurface formation on the downhole parameter;

determining whether or not a difference between the estimated response and the target response exceeds a specified error tolerance threshold associated with the target response, based on the comparison; and when the difference between the estimated response and the target response is determined to exceed the specified error tolerance threshold associated with the target response, adjusting the values of the one or more diversion control parameters until the difference between the estimated response and the target response no longer exceeds the specified error tolerance threshold.

3. The method of claim 1, wherein, when the actual response is less than the estimated response, the updating comprises:

repeating the estimating, calculating, injecting, monitoring, and updating over each of the one or more subsequent diversion phases until the difference between the estimated response of the diverter on the downhole parameter and the actual response being monitored is determined not to exceed the error tolerance threshold.

4. The method of claim 1, wherein the current stage of the stimulation treatment includes a plurality of treatment cycles, the diversion phase is performed after a first of the plurality of treatment cycles, and when the difference is determined not to exceed the error tolerance threshold, the method further comprises:

performing a second of the plurality of treatment cycles following the diversion phase for the remainder of the current stage of the stimulation treatment.

5. The method of claim 1, further comprising:

repeating the estimating, calculating, injecting, monitoring, and updating as each of the subsequent diversion phases is performed over the remainder of the current stage of the stimulation treatment.

6. The method of claim 1, wherein the downhole parameter is at least one of a pressure, a temperature, strain, or an acoustic energy distribution within the subsurface formation along the portion of the wellbore.

7. The method of claim 6, wherein the data relating to the downhole parameter includes real-time measurements obtained from one or more wellsite data sources.

8. The method of claim 7, wherein the real-time measurements include pressure measurements obtained from pressure sensors at a surface of the wellbore, and the diagnostic data model is used to estimate a pressure response of the diverter to be injected into the subsurface formation.

9. The method of claim 7, wherein the real-time measurements are obtained from fiber-optic sensors disposed within the wellbore, and the fiber-optic sensors are used to perform at least one of a distributed acoustic sensing, distributed strain sensing, or a distributed temperature sensing along a path of the wellbore through the subsurface formation.

10. The method of claim 9, wherein the diagnostic data model is used to estimate a fluid flow distribution response of the diverter to be injected into the subsurface formation, based on the real-time measurements obtained from the fiber-optic sensors.

11. The method of claim 1, wherein the one or more diversion control parameters include one or more of an amount, a concentration, and a pumping rate of the diverter to be injected into the subsurface formation.

12. The method of claim 11, wherein the updated diagnostic data model is used to adjust at least one of the amount, the concentration, or the pumping rate of the diverter to be injected for performing each of the subsequent diversion phases.

13. A system comprising:

at least one processor; and a memory coupled to the processor having instructions stored therein, which when executed by the processor, cause the processor to perform functions including functions to:

obtain data relating to at least one downhole parameter for a current stage of a stimulation treatment along a portion of a wellbore within a subsurface formation, the current stage including at least one diversion phase for a diverter to be injected into the subsurface formation along the portion of the wellbore;

estimate a response of the diverter on the downhole parameter, based on the obtained data and a diagnostic data model selected for the at least one diversion phase of the stimulation treatment within the subsurface formation;

calculate values for one or more diversion control parameters, based on the estimated response;

inject the diverter into the subsurface formation via formation entry points along the portion of the wellbore to perform the diversion phase according to the calculated values of the one or more diversion control parameters;

monitor an actual response of the injected diverter on the downhole parameter during the diversion phase;

determine that a difference between the actual response and the estimated response of the diverter on the downhole parameter exceeds an error tolerance threshold;

update the diagnostic data model based on the difference, based on the determination, wherein the updated diagnostic data model is used to update the estimated response of the diverter, and the updated response of the diverter is used to update the values of the one or more diversion control parameters for one or more subsequent diversion phases to be performed along the wellbore; and perform the one or more subsequent diversion phases over at least one of a remainder of the current stage or a subsequent stage of the stimulation treatment along the wellbore, based on the updated values of the one or more diversion control parameters.

14. The system of claim 13, wherein the functions performed by the processor further include functions to:

compare the estimated response to a target response of the diverter to be injected into the subsurface formation on the downhole parameter;

determine whether or not a difference between the estimated response and the target response exceeds a specified error tolerance threshold associated with the target response, based on the comparison; and when the difference between the estimated response and the target response is determined to exceed the specified error tolerance threshold associated with the target response, adjust the values of the one or more diversion control parameters until the difference between the estimated response and the target response no longer exceeds the specified error tolerance threshold.

15. The system of claim 13, wherein, when the actual response is less than the estimated response, the estimation, calculation, injection, monitoring, and updating functions are repeated over each of the one or more subsequent diversion phases until the difference between the estimated response of the diverter on the downhole parameter and the actual response being monitored is determined not to exceed the error tolerance threshold.

16. The system of claim 13, wherein the current stage of the stimulation treatment includes a plurality of treatment cycles, the diversion phase is performed after a first of the plurality of treatment cycles, and when the difference is determined not to exceed the error tolerance threshold, the functions performed by the processor further comprise functions to:
perform a second of the plurality of treatment cycles following the diversion phase for the remainder of the current stage of the stimulation treatment.

17. The system of claim 13, wherein the estimation, calculation, injection, monitoring, and updating functions are repeated as each of the subsequent diversion phases is performed over the remainder of the current stage of the stimulation treatment.

18. The system of claim 13, wherein the downhole parameter is at least one of a pressure, a temperature, strain, or an acoustic energy distribution within the subsurface formation along the portion of the wellbore, the data relating to the downhole parameter includes real-time measurements obtained from one or more wellsite data sources, and the diagnostic data model is used to estimate a fluid flow distribution response of the diverter to be injected into the subsurface formation, based on the real-time measurements obtained from the one or more wellsite data sources.

19. The system of claim 13, wherein the one or more diversion control parameters include one or more of an amount, a concentration, and a pumping rate of the diverter to be injected into the subsurface formation, and the updated diagnostic data model is used to adjust at least one of the amount, the concentration, or the pumping rate of the diverter to be injected for performing each of the subsequent diversion phases.

20. A non-transitory computer-readable storage medium having instructions stored therein, which when executed by a computer cause the computer to perform a plurality of functions, including functions to:

obtain data relating to at least one downhole parameter for a current stage of a stimulation treatment along a portion of a wellbore within a subsurface formation, the current stage including at least one diversion phase for a diverter to be injected into the subsurface formation along the portion of the wellbore;

estimate a response of the diverter on the downhole parameter, based on the obtained data and a diagnostic data model selected for the at least one diversion phase of the stimulation treatment within the subsurface formation;

calculate values for one or more diversion control parameters, based on the estimated response;

inject the diverter into the subsurface formation via formation entry points along the portion of the wellbore to perform the diversion phase according to the calculated values of the one or more diversion control parameters;

monitor an actual response of the injected diverter on the downhole parameter during the diversion phase;

determine that a difference between the actual response and the estimated response of the diverter on the downhole parameter exceeds an error tolerance threshold;

update the diagnostic data model based on the difference, based on the determination, wherein the updated diagnostic data model is used to update the estimated response of the diverter, and the updated response of the diverter is used to update the values of the one or more diversion control parameters for one or more subsequent diversion phases to be performed along the wellbore; and perform the one or more subsequent diversion phases over at least one of a remainder of the current stage or a subsequent stage of the stimulation treatment along the wellbore, based on the updated values of the one or more diversion control parameters.

* * * * *